US012766574B2

(12) United States Patent
Moriya

(10) Patent No.: US 12,766,574 B2
(45) Date of Patent: Oct. 20, 2026

(54) SUBSTRATE PROCESSING DEVICE AND MAINTENANCE METHOD FOR SUBSTRATE PROCESSING DEVICE

(71) Applicant: SCREEN Holdings Co., Ltd., Kyoto (JP)

(72) Inventor: Chiaki Moriya, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 134 days.

(21) Appl. No.: 18/890,727

(22) Filed: Sep. 19, 2024

(65) Prior Publication Data

US 2025/0091104 A1 Mar. 20, 2025

(30) Foreign Application Priority Data

Sep. 20, 2023 (JP) ................................ 2023-152517

(51) Int. Cl.
*B08B 15/02* (2006.01)
*B08B 3/10* (2006.01)

(52) U.S. Cl.
CPC ................ *B08B 15/02* (2013.01); *B08B 3/10* (2013.01)

(58) Field of Classification Search
None
See application file for complete search history.

(56) References Cited

U.S. PATENT DOCUMENTS 8,308,440 B2 * 11/2012 Shirai ..................... F16K 51/02 137/565.17
2015/0314338 A1 11/2015 Morioka et al.
2016/0126112 A1 5/2016 Minamida et al.
2021/0210364 A1 7/2021 Nishide et al.
2021/0265177 A1 8/2021 Sawashima et al.
2021/0265178 A1 8/2021 Sawashima et al.

FOREIGN PATENT DOCUMENTS

CN 202674338 U 1/2013
CN 208433383 U 1/2019
CN 111895125 A 11/2020
(Continued)

OTHER PUBLICATIONS

JP 2016072480 A machine translation, Substrate Processing System, Iwao (Year: 2016).*
(Continued)

*Primary Examiner* — Cristi J Tate-Sims
(74) *Attorney, Agent, or Firm* — OSTROLENK FABER LLP

(57) ABSTRACT

A substrate processing device includes a processing chamber, three exhaust pipes, and an exhaust switching mechanism. The exhaust switching mechanism includes a switching box, three opening/closing mechanisms that individually open/close three communication ports for individually communicating the switching box and the three exhaust pipes, and three cleaning nozzles provided on an inner side of the switching box in correspondence with the three opening/closing mechanisms. Each of the three cleaning nozzles is provided to face the link mechanism of the corresponding opening/closing mechanism, and injects cleaning liquid to the link mechanism of the corresponding opening/closing mechanism.

12 Claims, 14 Drawing Sheets

(56) References Cited

FOREIGN PATENT DOCUMENTS

| | | | |
|---|---|---|---|
| CN | 113883279 | A | 1/2022 |
| JP | H08-294836 | A | 11/1996 |
| JP | 2012-099582 | A | 5/2012 |
| JP | 2016-072480 | A | 5/2016 |
| JP | 2021-136435 | A | 9/2021 |
| KR | 10-2012-0103170 | A | 9/2012 |
| KR | 10-2015-0102998 | A | 9/2015 |
| KR | 10-2016-0052346 | A | 5/2016 |
| KR | 10-2021-0108903 | A | 9/2021 |

OTHER PUBLICATIONS

Notice of Allowance dated Aug. 5, 2025 for corresponding Korean Patent Application No. 10-2024-0126693.

Office Action dated Feb. 6, 2025 for corresponding Taiwanese Patent Application No. 113134840.

* cited by examiner

SUBSTRATE PROCESSING DEVICE AND MAINTENANCE METHOD FOR SUBSTRATE PROCESSING DEVICE

CROSS-REFERENCE TO RELATED APPLICATIONS

This application claims priority to Japanese Patent Application No. 2023-152517 filed Sep. 20, 2023, the subject matter of which is incorporated herein by reference in entirety.

BACKGROUND

Technical Field

The present invention relates to a substrate processing device for processing a substrate and a maintenance method thereof. Examples of the substrate include, for example, a semiconductor substrate, a substrate for a flat panel display (FPD), a glass substrate for a photomask, a substrate for an optical disk, a substrate for a magnetic disk, a ceramic substrate, and a substrate for a solar cell. Examples of the FPD include a liquid crystal display device and an organic electroluminescence (EL) display device.

Related Art

A substrate processing device includes a processing housing (processing chamber) that processes a substrate, three exhaust pipes, and a switching mechanism that switches an exhaust path of the processing housing to one of the three exhaust pipes (see e.g., JP 2021-136435 A). The three exhaust pipes have three openings. The switching mechanism includes three open/close members (lid member, open/close valve, or open/close valve body) that individually opens/closes the three openings.

JP 2012-099582 A discloses a liquid processing device (substrate processing device) including a liquid processing unit, a main exhaust duct coupled to the liquid processing unit, a plurality of individual exhaust ducts coupled to the main exhaust duct, and a plurality of exhaust open/close valves provided between the main exhaust duct and each of the plurality of individual exhaust ducts.

The liquid processing device includes a branch portion that branches into an individual exhaust duct on the uppermost stream in the exhaust direction, and a cleaning fluid ejecting portion provided between the liquid processing unit and the branch portion. The cleaning fluid ejecting portion is located upstream of the plurality of individual exhaust ducts. The cleaning fluid ejecting portion ejects the cleaning fluid in a mist form (atomized form). Accordingly, the main exhaust duct, the plurality of individual exhaust ducts, and the plurality of exhaust open/close valves can be cleaned.

SUMMARY

However, the substrate processing device may have the following problems. An open/close member (lid member, open/close valve, or open/close valve body) that opens/closes the opening is disposed inside a switching housing (switching box) of the switching mechanism and moved by a power source. When crystals are generated by mixing a plurality of types of chemical solution atmospheres in the switching housing, the operation of the link mechanism that moves the open/close member may be hindered.

Here, the invention of JP 2012-099582 A cleans the exhaust open/close valves by sending a mist-like cleaning fluid from the upstream. However, the invention of JP 2012-099582 A cleans not only the exhaust open/close valves but also the main exhaust duct and the plurality of individual exhaust ducts. Therefore, there is a possibility that the exhaust open/close valve cannot be efficiently cleaned.

The present invention has been made in view of such circumstances, and an object thereof is to provide a substrate processing device and a maintenance method for the substrate processing device capable of efficiently cleaning an opening/closing mechanism.

In order to achieve such an object, the present invention has the following configuration. That is, a substrate processing device according to the present invention is a substrate processing device for processing a substrate, the substrate processing device including a processing chamber including a holding unit that holds the substrate in a horizontal posture and a chemical solution nozzle that discharges chemical solution to the substrate held by the holding unit; a plurality of exhaust pipes provided on a side of the processing chamber and extending in a vertical direction; and an exhaust switching mechanism that switches an exhaust path from the processing chamber to any of the plurality of exhaust pipes, in which the exhaust switching mechanism includes a switching box that connects the processing chamber to the plurality of exhaust pipes, a plurality of opening/closing mechanisms that individually opens/closes a plurality of communication ports for individually communicating the switching box and the plurality of exhaust pipes, and a plurality of cleaning nozzles provided on an inner side of the switching box so as to correspond to the plurality of opening/closing mechanisms; each of the plurality of opening/closing mechanisms includes an actuator provided on an outer side of the switching box, a lid member provided on the inner side of the switching box, and a link mechanism provided on the inner side of the switching box, the link mechanism converting linear movement of a rod extending from the actuator into opening/closing operation of the lid member; and each of the plurality of cleaning nozzles is provided to face the link mechanism of a corresponding one of the opening/closing mechanisms, and is configured to inject cleaning liquid to the link mechanism of the corresponding opening/closing mechanism.

According to the substrate processing device of the present invention, the cleaning nozzle is provided so as to face the link mechanism of the opening/closing mechanism. Furthermore, the cleaning nozzle injects the cleaning liquid to the link mechanism of the opening/closing mechanism. As a result, a relatively large amount of cleaning liquid can be supplied to the link mechanism. Therefore, at least one of the chemical solution and the crystal adhering to the link mechanism can be cleaned away. Thus, the link mechanism (opening/closing mechanism) can be efficiently cleaned.

Furthermore, in the substrate processing device described above, each of the plurality of cleaning nozzles is preferably configured to inject the cleaning liquid to the link mechanism of the corresponding opening/closing mechanism such that an upper end of the lid member of the corresponding opening/closing mechanism is included in an injection range of the cleaning liquid.

When the upper end of the lid member is included in the injection range (injection angle) of the cleaning liquid, a relatively large amount of cleaning liquid can be supplied to the upper end of the lid member. Therefore, for example, the droplet of the cleaning liquid adhered to the upper end of the lid member flows down along the lid member from the upper end of the lid member. Thus, the lid member can be cleaned. Therefore, for example, the outer edge portion of the lid member can be cleaned. Thus, the opening/closing operation of the lid member can be prevented from being hindered.

Furthermore, in the substrate processing device described above, each of the plurality of opening/closing mechanisms preferably includes a packing provided on a surface of the lid member facing one communication port of the plurality of communication ports to surround an outer periphery of the one communication port.

When the opening/closing mechanism closes the communication port using the lid member, the gas in the switching box can be prevented from entering the predetermined exhaust pipe. Therefore, in the predetermined exhaust pipe, it is possible to prevent mist (or vapor) of two different kinds of chemical solutions from being mixed to generate crystals.

Moreover, in the substrate processing device described above, preferably, the exhaust switching mechanism further includes a nozzle attachment member provided on the inner side of the switching box and to which the plurality of cleaning nozzles are attached, the nozzle attachment member has a cleaning liquid flow path for sending the cleaning liquid on an inner side, and the cleaning liquid flow path is branched to send the cleaning liquid supplied from a common inlet to the plurality of cleaning nozzles.

All of the plurality of cleaning nozzles are attached to a nozzle attachment member having a common inlet. Therefore, a piping may not be individually provided in the plurality of cleaning nozzles. Thus, a proportion of the supply path of the cleaning liquid occupying a space in the switching box can be suppressed. In addition, the supply path of the cleaning liquid can be simply configured.

Furthermore, in the substrate processing device described above, preferably, the switching box is connected to an inside of the processing chamber via a connecting pipe, the connecting pipe includes an exhaust control damper for controlling an air volume of gas on an inner side, and the exhaust switching mechanism includes a control damper cleaning nozzle provided on the inner side of the switching box and configured to inject the cleaning liquid toward the exhaust control damper, a first cleaning liquid piping provided on the inner side of the switching box and connected to the control damper cleaning nozzle, and a second cleaning liquid piping provided on the inner side of the switching box, the second cleaning liquid piping being branched from the first cleaning liquid piping and connected to the common inlet of the nozzle attachment member.

The second cleaning liquid piping for sending the cleaning liquid to the plurality of cleaning nozzles is branched from the first cleaning liquid piping for sending the cleaning liquid to the control damper cleaning nozzle. As a result, a proportion of the supply path of the cleaning liquid occupying a space in the switching box can be suppressed. In addition, the supply path of the cleaning liquid can be simply configured.

In addition, in the substrate processing device described above, preferably, a control unit is further provided, in which the control unit sequentially switches a state in which any one of the plurality of communication ports is opened in order among the plurality of communication ports by operating the plurality of opening/closing mechanisms when the cleaning liquid is injected from the plurality of cleaning nozzles.

Any one of the plurality of communication ports is opened when the cleaning liquid is injected. Therefore, since the gas in the processing chamber is exhausted, cleanliness in the processing chamber can be maintained.

Furthermore, in the substrate processing device described above, a plurality of exhaust pipe side cleaning nozzles provided on inner sides of the plurality of exhaust pipes, respectively, are further preferably provided, the plurality of exhaust pipe side cleaning nozzles respectively injecting the cleaning liquid to the lid members of the plurality of opening/closing mechanisms through the plurality of communication ports.

Since the cleaning nozzle is provided on the inner side of the switching box, the cleaning nozzle may not be able to efficiently supply the cleaning liquid to the surface (front surface) facing the communication port of the lid member of the opening/closing mechanism. However, according to the present invention, the exhaust pipe side cleaning nozzle is provided on the inner side of the exhaust pipe. Therefore, the cleaning liquid can be efficiently supplied to the surface of the lid member of the opening/closing mechanism.

Moreover, in the substrate processing device described above, preferably, the switching box is connected to an inside of the processing chamber via a connecting pipe, and a bottom surface on the inner side of the switching box is inclined such that the cleaning liquid is collected in the connecting pipe. As a result, since the bottom surface on the inner side of the switching box is inclined, the cleaning liquid existing on the bottom surface in the switching box can be efficiently discharged from the switching box.

Moreover, in the substrate processing device described above, preferably, the switching box is connected to an inside of the processing chamber via a connecting pipe, and a bottom surface of the switching box is higher than a bottom surface of the processing chamber and is the same height as a bottom surface on an inner side of the connecting pipe. As a result, it is possible to discharge the cleaning liquid existing on the bottom surface in the switching box through a liquid discharge pipe in the processing chamber while preventing the liquid such as the cleaning liquid from entering the switching box from the processing chamber.

Furthermore, in the substrate processing device described above, each of the plurality of cleaning nozzles is preferably formed by a one-fluid nozzle that injects only the cleaning liquid. For example, when the cleaning nozzle is a two-fluid nozzle, it is necessary to send gas in addition to the cleaning liquid to the two-fluid nozzle. As a result, a piping for sending gas needs to be provided. According to the present invention, piping for sending this gas is unnecessary.

Furthermore, in the substrate processing device described above, each of the plurality of cleaning nozzles preferably injects mist-like cleaning liquid.

In addition, a maintenance method for a substrate processing device for processing a substrate according to the present invention is a maintenance method for a substrate processing device, in which the substrate processing device includes a processing chamber including a holding unit that holds the substrate in a horizontal posture and a chemical solution nozzle that discharges chemical solution to the substrate held by the holding unit, a plurality of exhaust pipes provided on a side of the processing chamber and extending in a vertical direction, and an exhaust switching mechanism that switches an exhaust path from the processing chamber to any of the plurality of exhaust pipes, the exhaust switching mechanism includes a switching box that connects the processing chamber to the plurality of exhaust pipes, and a plurality of opening/closing mechanisms that individually opens/closes a plurality of communication ports for individually communicating the switching box and the plurality of exhaust pipes, each of the plurality of opening/closing mechanisms includes an actuator provided on an outer side of the switching box, a lid member provided on the inner side of the switching box, and a link mechanism provided on the inner side of the switching box, the link mechanism converting linear movement of a rod extending from the actuator into opening/closing operation of the lid member, and the maintenance method includes an injection step of injecting cleaning liquid from the plurality of cleaning nozzles to the link mechanisms of corresponding ones of the plurality of opening/closing mechanisms, the plurality of cleaning nozzles are provided on an inner side of the switching box to face the link mechanisms of the corresponding plurality of opening/closing mechanisms.

According to the substrate processing device and the maintenance method for the substrate processing device according to the present invention, the opening/closing mechanism can be efficiently cleaned.

BRIEF DESCRIPTION OF DRAWINGS

For the purpose of illustrating the invention, there are shown in the drawings several forms which are presently preferred, it being understood, however, that the invention is not limited to the precise arrangement and instrumentalities shown.

DETAILED DESCRIPTION

First Example

Figure 1:
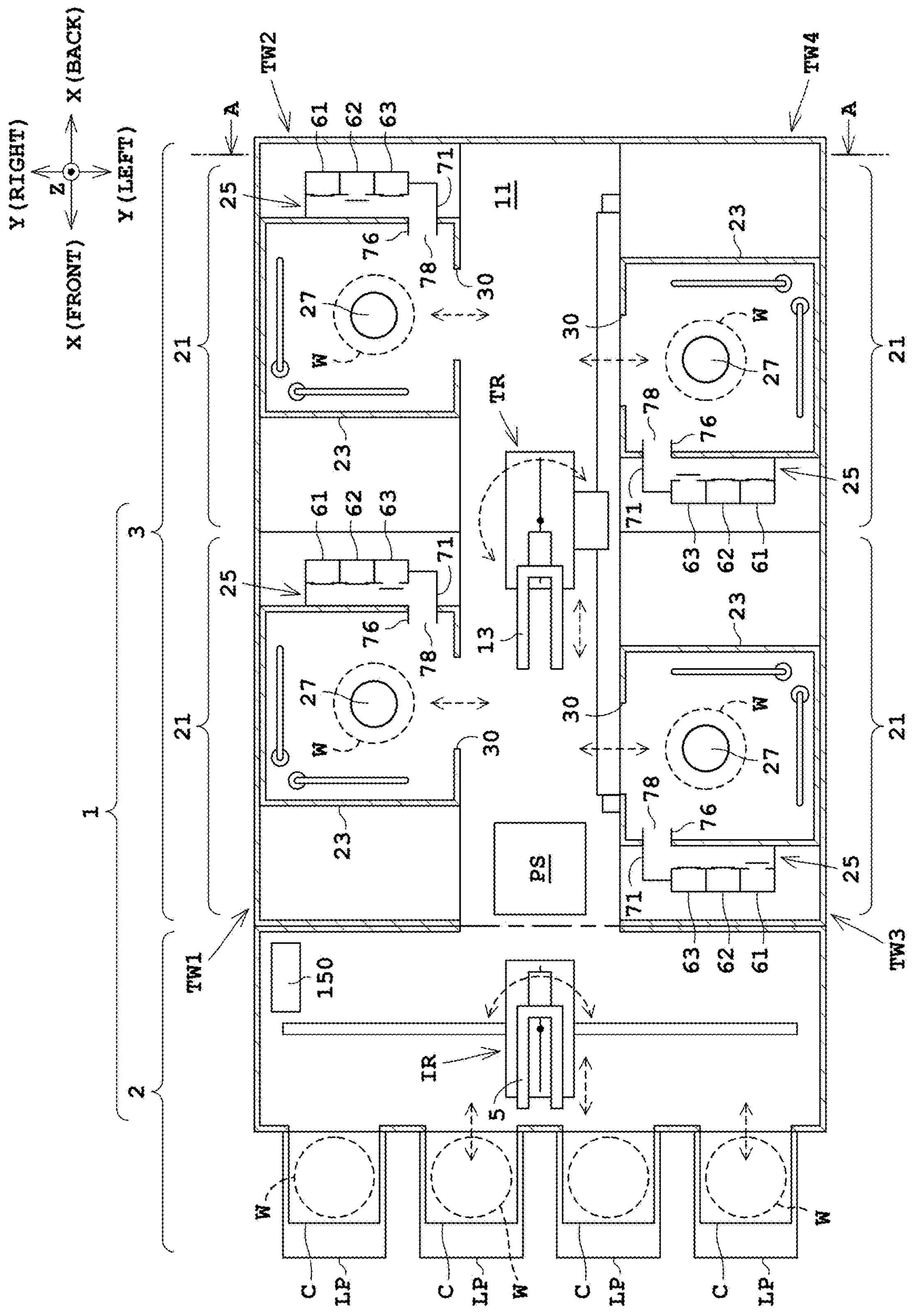
FIG. 1 is a plan view illustrating a schematic configuration of a substrate processing device according to a first example.
Figure 2:
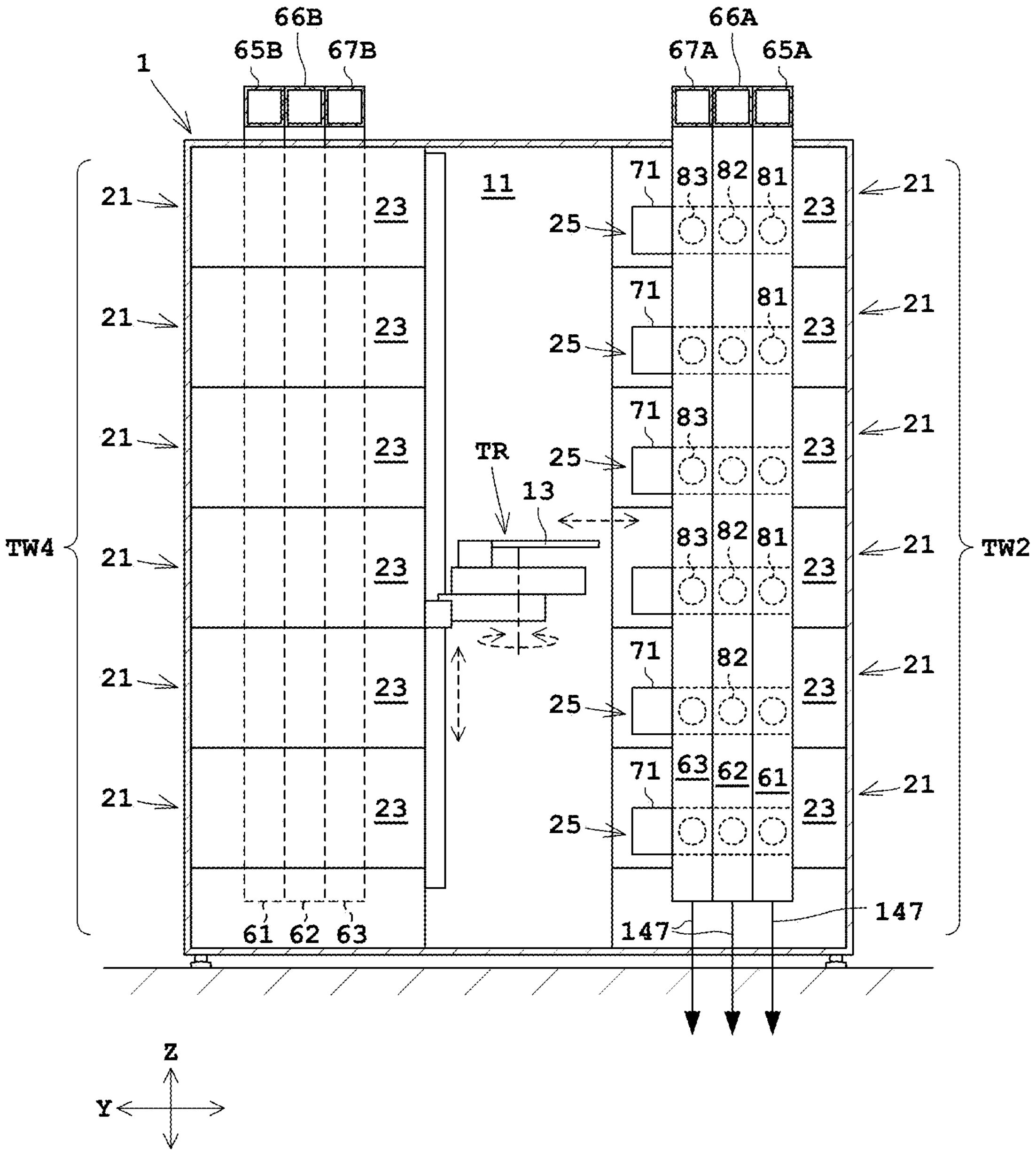
FIG. 2 is a longitudinal cross-sectional view of the substrate processing device as viewed as indicated by an arrow A-A in FIG. 1.

Hereinafter, a first example of the present invention will be described with reference to the drawings. FIG. 1 is a plan view (or transverse cross-sectional view) illustrating a schematic configuration of a substrate processing device 1 according to a first example. FIG. 2 is a longitudinal cross-sectional view of the substrate processing device 1 when viewed as indicated by an arrow A-A illustrated in FIG. 1.

<1. Substrate Processing Device>

Reference is now made to FIG. 1. The substrate processing device 1 is a sheet type (single substrate type) device that processes the substrates W one by one. The substrate processing device 1 includes an indexer block 2 and a processing block 3.

In the present specification, for the sake of convenience, a direction in which the indexer block 2 and the processing block 3 are arranged is referred to as a "front-back direction X". The front-back direction X is horizontal. For example, a direction from the processing block 3 toward the indexer block 2 in the front-back direction X is referred to as a "front side". A direction opposite to the front side is referred to as a "back side". A horizontal direction orthogonal to the front-back direction X is referred to as a "width direction Y". One direction in the "width direction Y" is appropriately referred to as a "right side". A direction opposite to the right side is referred to as a "left side". A direction perpendicular to the horizontal direction is referred to as a "vertical direction Z". In each drawing, front, back, right, left, top, and bottom are appropriately shown for reference.

<2. Indexer Block>

The indexer block 2 includes a plurality of (for example, four) load ports LP and an indexer robot IR. The load port LP is used to carry in and carry out the carrier C. The carrier C is placed on the load port LP. The load port LP is disposed on an outer side of the indexer block 2.

The carrier C accommodates a plurality of (for example, 25) substrates W. As the carrier C, for example, a front opening unify pod (FOUP) is used, but the carrier C is not limited thereto. The substrate W is formed in, for example, a disk shape.

The indexer robot IR is disposed on the inner side of the indexer block 2. The indexer robot IR transports the substrate W between, for example, four carriers C placed on four load ports LP and a substrate placing portion (shelf) PS described later. The indexer robot IR includes a hand 5. The hand 5 is movable and holds one substrate W. The indexer robot IR moves the hand 5 holding one substrate W in the horizontal direction (the front-back direction X and the width direction Y) and the vertical direction Z. Furthermore, the indexer robot IR rotates the hand 5 about the vertical axis.

<3. Processing Block>

The processing block 3 includes a transport robot TR, a substrate placing portion PS, and four towers TW1 to TW4. The transport robot TR and the substrate placing portion PS are provided in a transport space 11 extending in the front-back direction X. The transport space 11 extends linearly to the back side from the indexer block 2. The substrate placing portion PS is disposed between the indexer robot IR and the transport robot TR.

The transport robot TR transports the substrate W between the substrate placing portion PS and each processing unit 21 (described later) of the four towers TW1 to TW4. The transport robot TR includes a hand 13. The hand 13 is movable and holds one substrate W in a horizontal posture. The transport robot TR moves the hand 13 holding one substrate W in the horizontal direction (the front-back direction X and the width direction Y) and the vertical direction Z. Furthermore, the transport robot TR rotates the hand 13 about the vertical axis.

The first tower TW1 and the second tower TW2 are arranged in the front-back direction X along the transport space 11. Similarly, the third tower TW3 and the fourth tower TW4 are arranged in the front-back direction X along the transport space 11.

In addition, in the width direction Y, the two towers TW1 and TW2 are arranged to face the two towers TW3 and TW4 via the transport space 11. That is, the two towers TW1 and TW2 are arranged on the right side of the transport space 11. In addition, the two towers TW3 and TW4 are arranged on the left side of the transport space 11.

Each of the four towers TW1 to TW4 includes six processing units 21 arranged in the vertical direction Z. That is, the processing block 3 includes twenty-four processing units 21. Note that FIG. 2 shows that, for example, two towers TW2 and TW4 each include six processing units 21 arranged in the vertical direction Z.

Note that the processing block 3 includes four towers TW1 to TW4. In this regard, the processing block 3 may include one or two or more towers. Furthermore, each of the towers TW1 to TW4 include six processing units 21. In this regard, each of the towers TW1 to TW4 may include one processing unit 21 or two or more processing units 21 arranged in the vertical direction Z.

<3-1. Processing Chamber>

Figure 3:
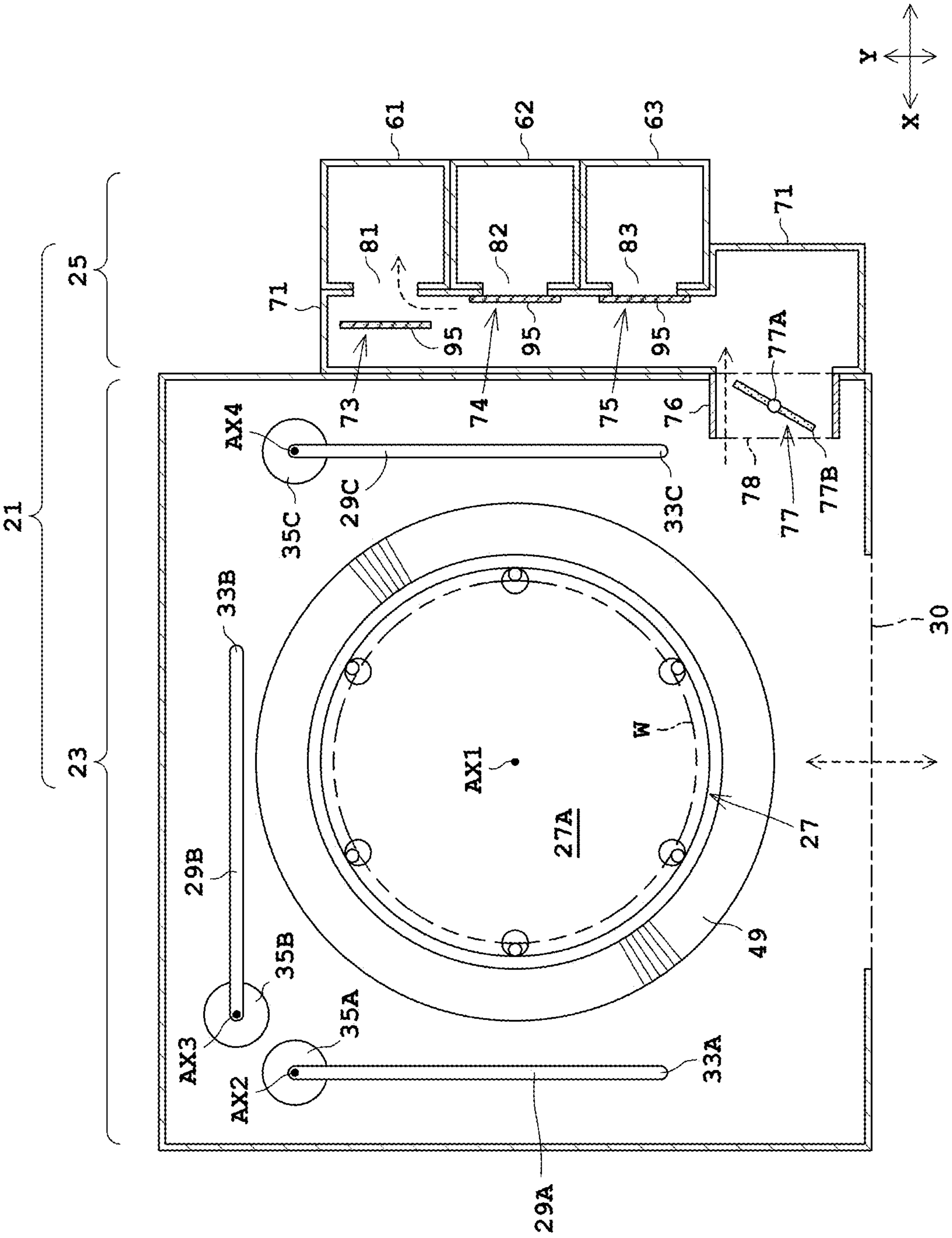
FIG. 3 is a transverse cross-sectional view illustrating a processing chamber and an exhaust switching mechanism.
Figure 4:
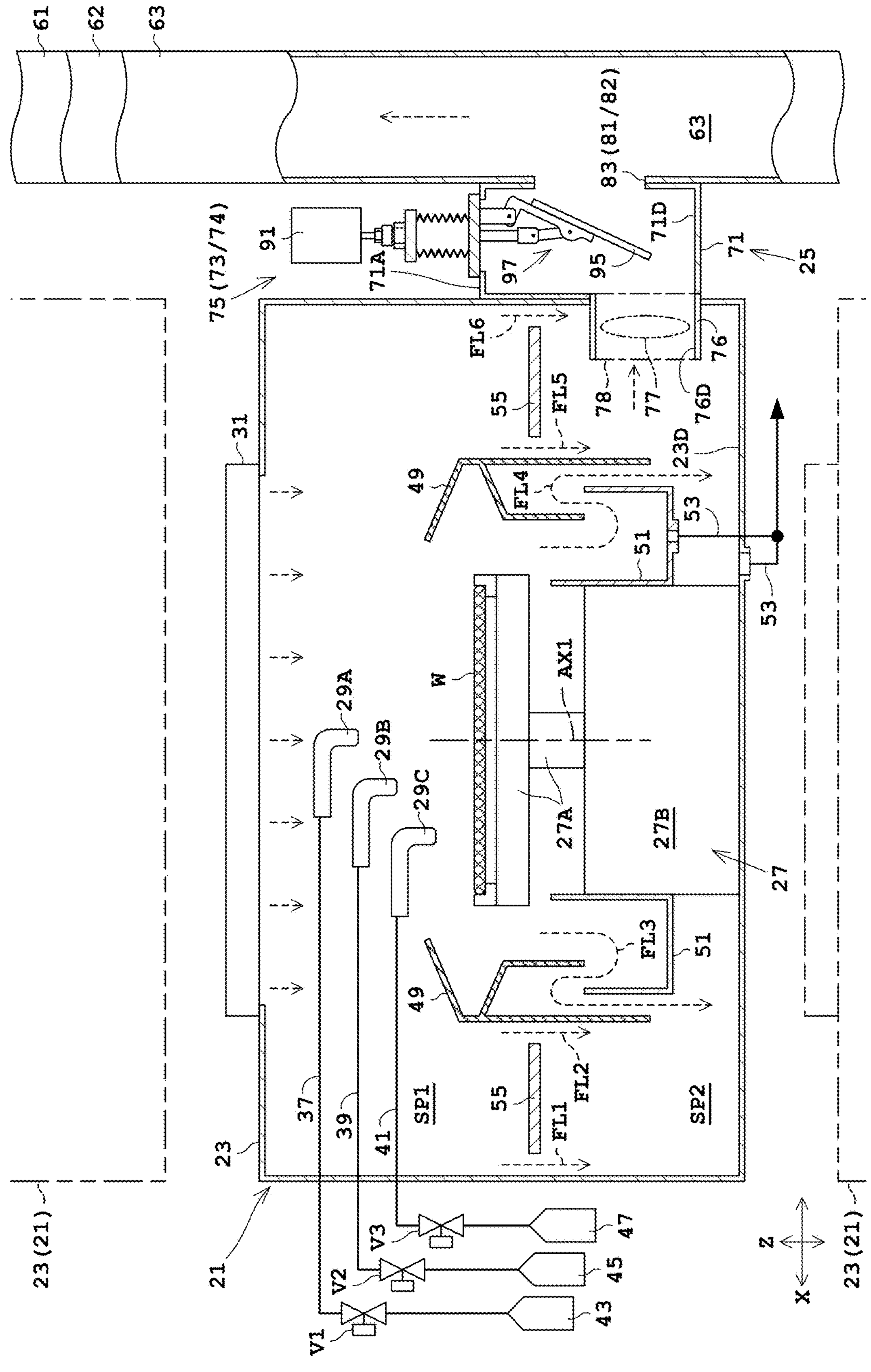
FIG. 4 is a longitudinal cross-sectional view illustrating the processing chamber and the exhaust switching mechanism.

As illustrated in FIG. 1, each processing unit 21 includes a processing chamber 23 and an exhaust switching mechanism 25. FIG. 3 is a transverse cross-sectional view illustrating the processing chamber 23 and the exhaust switching mechanism 25. FIG. 4 is a longitudinal cross-sectional view illustrating the processing chamber 23 and the exhaust switching mechanism 25.

The processing chamber 23 processes the substrates W one by one. The processing chamber 23 includes a holding and rotating unit 27, three nozzles 29A, 29B, and 29C, a substrate transport port 30, and a fan filter unit 31 (see FIG. 4). The holding and rotating unit 27 and the three nozzles 29A, 29B, and 29C are each provided in the processing chamber 23. As illustrated in FIG. 4, the fan filter unit 31 is provided on the ceiling of the processing chamber 23. The fan filter unit 31 supplies clean air (gas) into the processing chamber 23.

The substrate transport port 30 is disposed facing the transport space 11. The substrate W is transported onto the holding and rotating unit 27 through the substrate transport port 30. The substrate transport port 30 is opened/closed by a shutter (not illustrated). The holding and rotating unit 27 rotates the substrate W about a vertical axis AX1 while holding the substrate W in a horizontal posture. Specifically, the holding and rotating unit 27 includes a spin chuck 27A that holds the substrate W in a horizontal posture and an electric motor 27B that rotates the spin chuck 27A about the vertical axis AX1. The spin chuck 27A may be a chuck that holds the substrate W by sandwiching a side surface of the substrate W with three or more holding pins. Furthermore, the spin chuck 27A may be a chuck that holds a lower surface of the substrate W by vacuum suction.

Each of the three nozzles 29A, 29B, and 29C discharges chemical solutions onto the substrate W held by the holding and rotating unit 27. The three nozzles 29A, 29B, and 29C discharge the first chemical solution, the second chemical solution, and the third chemical solution. For example, the first nozzle 29A discharges a first chemical solution, and the second nozzle 29B discharges a second chemical solution. The third nozzle 29C discharges the third chemical solution. The first chemical solution, the second chemical solution, and the third chemical solution are different in type from each other. Note that when the first chemical solution, the second chemical solution, and the third chemical solution are not particularly distinguished, they are referred to as "chemical solution".

The first chemical solution is classified, for example, as an acidic liquid (acid-based chemical solution). The first chemical solution contains, for example, at least one of hydrofluoric acid (hydrofluoric acid), hydrochloric acid hydrogen peroxide solution, sulfuric acid, sulfuric acid hydrogen peroxide solution, fluoronitric acid (mixed solution of hydrofluoric acid and nitric acid), and hydrochloric acid.

The second chemical solution is classified into, for example, an alkaline solution (alkaline chemical solution). The second chemical solution contains, for example, at least one of ammonia hydrogen peroxide water (SC1), ammonia water, an ammonium fluoride solution, and tetramethylammonium hydroxide (TMAH).

The third chemical solution is classified into, for example, an organic liquid (organic-based chemical solution). The organic liquid contains at least one of isopropyl alcohol (IPA), methanol, ethanol, hydrofluoroether (HFE), and acetone.

Each of the nozzles 29A, 29B, and 29C has a linearly extending tube shape. The nozzles 29A, 29B, and 29C include distal end portions 33A, 33B, and 33C, respectively. Each of the distal end portions 33A, 33B, and 33C has a discharge port (not illustrated) for discharging a chemical solution.

The processing chamber 23 further includes three rotation driving units 35A, 35B, and 35C. The three rotation driving units 35A, 35B, and 35C are connected to the three basal end portions of the three nozzles 29A, 29B, and 29C, respectively. Each rotation driving unit 35A, 35B, and 35C includes, for example, an electric motor. The first rotation driving unit 35A rotates the first nozzle 29A about the vertical axis AX2. The second rotation driving unit 35B rotates the second nozzle 29B about the vertical axis AX3. The third rotation driving unit 35C rotates the third nozzle 29C about the vertical axis AX4.

As illustrated in FIG. 4, the processing chamber 23 further includes three piping 37, 39, and 41. One end of the first piping 37 is connected to the first nozzle 29A. The other end of the first piping 37 is connected to a first chemical solution supply source 43. The first piping 37 is provided with an open/close valve V1. When the open/close valve V1 is opened, the first chemical solution is sent from the first chemical solution supply source 43 to the first piping 37, and the first chemical solution is discharged from the first nozzle 29A.

Similarly, one end of the second piping 39 is connected to the second nozzle 29B. The other end of the second piping 39 is connected to a second chemical solution supply source 45. The second piping 39 is provided with an open/close valve V2. When the open/close valve V2 is opened, the second chemical solution is discharged from the second nozzle 29B. Similarly, one end of the third piping 41 is connected to the third nozzle 29C. The other end of the third piping 41 is connected to a third chemical solution supply source 47. The third piping 41 is provided with an open/close valve V3. When the open/close valve V3 is opened, the third chemical solution is discharged from the third nozzle 29C.

The processing chamber 23 further includes an upper cup 49 and a lower cup 51. Each of the upper cup 49 and the lower cup 51 is formed in a hollow cylindrical shape. As illustrated in FIGS. 3 and 4, the upper cup 49 and the lower cup 51 are disposed so as to surround side surfaces of the substrate W and the spin chuck 27A. The upper cup 49 is disposed above the lower cup 51. The upper cup 49 moves up and down with respect to the lower cup 51, the substrate W, and the spin chuck 27A by a driving unit (not illustrated).

In addition, the upper cup 49 receives the chemical solution scattered from the substrate W due to rotation of the substrate W or the like, and guides the chemical solution to the lower cup 51. The lower cup 51 is provided with a liquid discharge pipe 53 at the bottom. The lower cup 51 discharges the chemical solution by the liquid discharge pipe 53 while accommodating the chemical solution fed from the upper cup 49 and the like. Note that the liquid discharge pipe 53 is also connected to the bottom of the processing chamber 23.

The processing chamber 23 includes a partition plate 55 that partitions the internal upper space SP1 and lower space SP2. The air supplied from the fan filter unit 31 is sent from the upper space SP1 to the lower space SP2 while flowing through the inner side and the outer side of the upper cup 49 as in flows FL1, FL2, FL3, FL4, FL5, and FL6 indicated by broken lines in FIG. 4. Then, the air is sent from the lower space SP2 of the processing chamber 23 to any of the three exhaust pipes 61, 62, and 63 (described later) via an exhaust switching mechanism 25 described later. Note that in FIG. 3, illustration of the partition plate 55 is omitted.

<3-2. Three Exhaust Pipes>

Three exhaust pipes 61, 62, and 63 extending in the vertical direction Z are provided on the side of each processing chamber 23. Specifically, the three exhaust pipes 61, 62, and 63 are provided in each of the four towers TW1 to TW4.

For example, as illustrated in FIG. 2, the three exhaust pipes 61, 62, and 63 are provided on the sides of the six processing chambers 23 of the second tower TW2. Each of the three exhaust pipes 61, 62, and 63 extends in the vertical direction Z. In each of the four towers TW1 to TW4, the three exhaust pipes 61, 62, and 63 are arranged side by side in the width direction Y.

As illustrated in FIG. 2, six horizontal exhaust pipes 65A, 66A, 67A, 65B, 66B, and 67B are provided on the roof of the substrate processing device 1. The six exhaust pipes 61, 62, and 63 of the two towers TW1 and TW2 are connected to the three horizontal exhaust pipes 65A, 66A, and 67A. In addition, the six exhaust pipes 61, 62, and 63 of the two towers TW3 and TW4 are connected to the three horizontal exhaust pipes 65B, 66B, and 67B. For example, an upper end of the first exhaust pipe 61 of the first tower TW1 and the upper end of the first exhaust pipe 61 of the second tower TW2 are connected to the horizontal exhaust pipe 65A. Similarly, the second exhaust pipe 62 of the first tower TW1 and the second exhaust pipe 62 of the second tower TW2 are connected to the horizontal exhaust pipe 66A. In addition, the third exhaust pipe 63 of the first tower TW1 and the third exhaust pipe 63 of the second tower TW2 are connected to the horizontal exhaust pipe 67A.

<3-3. Exhaust Switching Mechanism>

As described above, each processing unit 21 includes the exhaust switching mechanism 25. The exhaust switching mechanism 25 switches an exhaust path from the processing chamber 23 to one of the three exhaust pipes 61, 62, and 63. As illustrated in FIGS. 1, 3, and 4, the exhaust switching mechanism 25 is disposed between the processing chamber 23 and the three exhaust pipes 61, 62, and 63.

The exhaust switching mechanism 25 includes a switching box 71 and three opening/closing mechanisms 73, 74, and 75. The switching box 71 connects the processing chamber 23 to the three exhaust pipes 61, 62, and 63. The switching box 71 connects into the processing chamber 23 via a connecting pipe 76 (exhaust inlet 78).

The connecting pipe 76 connects the processing chamber 23 and the switching box 71. The connecting pipe 76 has an exhaust control damper 77 on the inner side. The exhaust control damper 77 controls an air volume (=volume/time) of gas (exhaust air). As illustrated in FIG. 3, the exhaust control damper 77 includes a plate-shaped member 77B rotatable about a vertical shaft 77A. The plate-shaped member 77B is driven by an electric motor (not illustrated). One end of the connecting pipe 76 forms an exhaust inlet 78. The gas in the processing chamber 23 is sent from the exhaust inlet 78 into the switching box 71.

The three exhaust pipes 61, 62, and 63 are provided with three communication ports 81, 82, and 83 corresponding to the region of the switching box 71. The first exhaust pipe 61 is provided with a first communication port 81. Similarly, the second exhaust pipe 62 is provided with a second communication port 82. The third exhaust pipe 63 is provided with a third communication port 83. The three communication ports 81, 82, and 83 are aligned in the width direction Y. Each of the three communication ports 81, 82, and 83 is formed in a circular shape.

The three communication ports 81, 82, and 83 communicate the switching box 71 with the three exhaust pipes 61, 62, and 63. The first communication port 81 communicates the switching box 71 and the first exhaust pipe 61. Similarly, the second communication port 82 communicates the switching box 71 and the second exhaust pipe 62. The third communication port 83 communicates the switching box 71 and the third exhaust pipe 63.

The three opening/closing mechanisms 73, 74, and 75 individually open/close the three communication ports 81, 82, and 83. Specifically, as illustrated in FIG. 3, the first opening/closing mechanism 73 opens/closes the first communication port 81. Similarly, the second opening/closing mechanism 74 opens/closes the second communication port 82. The third opening/closing mechanism 75 opens and closes the third communication port 83.

Figure 5:
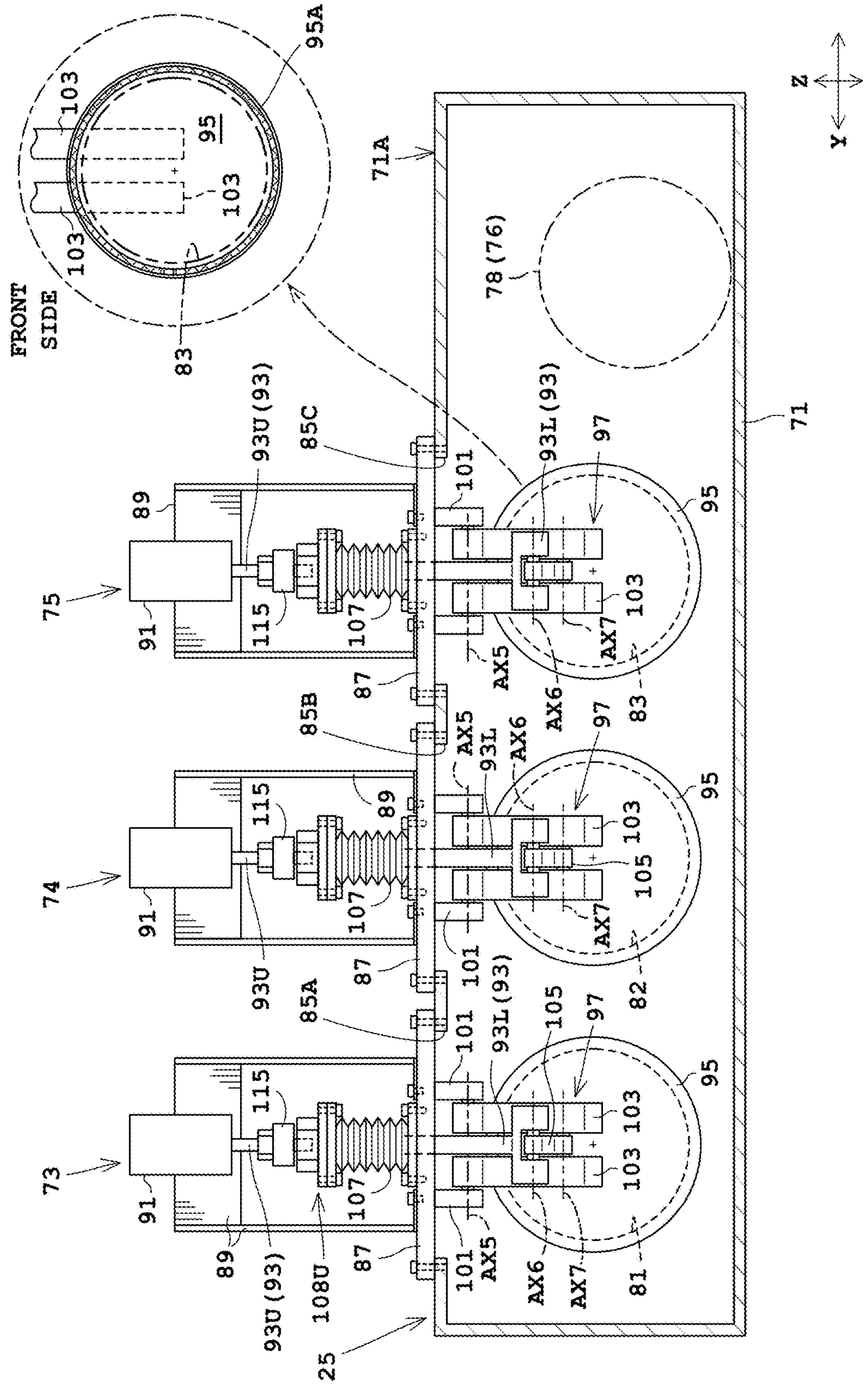
FIG. 5 is a side view illustrating a state in which three opening/closing mechanisms are attached to the switching box.

Reference is now made to FIG. 5. Each of the three opening/closing mechanisms 73, 74, and 75 is configured as an integrally assembled component having a base member 87 (described later) as a base. This facilitates attachment and detachment of each of the three opening/closing mechanisms 73, 74, and 75 to and from the switching box 71.

A ceiling wall 71A of the switching box 71 includes three attachment openings 85A, 85B, and 85C. The three attachment openings 85A, 85B, and 85C are arranged in the width direction Y. The three opening/closing mechanisms 73, 74, and 75 are attached to the three attachment openings 85A, 85B, and 85C. Specifically, the first opening/closing mechanism 73 is attached to the attachment opening 85A. Similarly, the second opening/closing mechanism 74 is attached to the attachment opening 85B, and the third opening/closing mechanism 75 is attached to the attachment opening 85C. Note that the attachment is performed by, for example, a plurality of screws.

The three opening/closing mechanisms 73, 74, and 75 have substantially the same configuration. Each of the three opening/closing mechanisms 73, 74, and 75 includes a base member 87, an upper support member 89, an actuator 91, a rod 93, a lid member (open/close valve or open/close valve body) 95, and a link mechanism 97. The rod 93 includes an upper rod 93U and a lower rod 93L. When the upper rod 93U and the lower rod 93L are not distinguished from each other, they are referred to as "rod 93".

The upper support member 89, the actuator 91, and the upper rod 93U are provided on an outer side of the switching box 71. The lid member 95 and the link mechanism 97 are provided on an inner side of the switching box 71. The lower rod 93L is disposed on the inner side and the outer side of the switching box 71 while being accommodated in the bellows 107.

The base member 87 is detachably attached to each of the three attachment openings 85A, 85B, and 85C. The base member 87 is a plate-like member. For example, when the base member 87 is attached to the attachment opening 85A, the attachment opening 85A is closed by the base member 87.

The upper support member 89 is provided on an upper surface of the base member 87. The upper support member 89 is formed in a gate shape, but may not be formed in the gate shape. The actuator 91 is attached to the upper support member 89. The actuator 91 includes, for example, an air cylinder, but may include an electric motor.

The rod 93 extends downward from the actuator 91 while penetrating through the base member 87. The rod 93 (upper rod 93U) is moved in the vertical direction Z by the actuator 91. The lid member 95 is disposed below the base member 87.

The lid member 95 is a member that allows gas from the processing chamber 23 to flow or blocks gas from the processing chamber 23 between the inner side of the switching box 71 and, for example, the first exhaust pipe 61. A state allowing the gas from the processing chamber 23 to flow is referred to as an open state. In addition, a state for blocking the gas from the processing chamber 23 is referred to as a closed state. The lid member 95 is formed in a disk shape.

In addition, as illustrated in a circled frame of a one-dot chain line in FIG. 5, a packing 95A for surrounding an outer periphery of the third communication port 83 is provided on a surface (front surface),corresponding to the third communication port 83, of the lid member 95 of the third opening/closing mechanism 75. Similarly, a packing 95A for surrounding an outer periphery of the first communication port 81 is provided on a surface, facing the first communication port 81, of the lid member 95 of the first opening/closing mechanism 73. Similarly, a packing 95A for surrounding an outer periphery of the second communication port 82 is provided on a surface, facing the second communication port 82, of the lid member 95 of the second opening/closing mechanism 74. For example, when the first opening/closing mechanism 73 closes the first communication port 81 using the lid member 95, gas in the switching box 71 can be prevented from entering the first exhaust pipe 61. Therefore, for example, in the first exhaust pipe 61, it is possible to prevent mist (or vapor) of two different kinds of chemical solutions from being mixed to generate crystals.

Figure 6A:
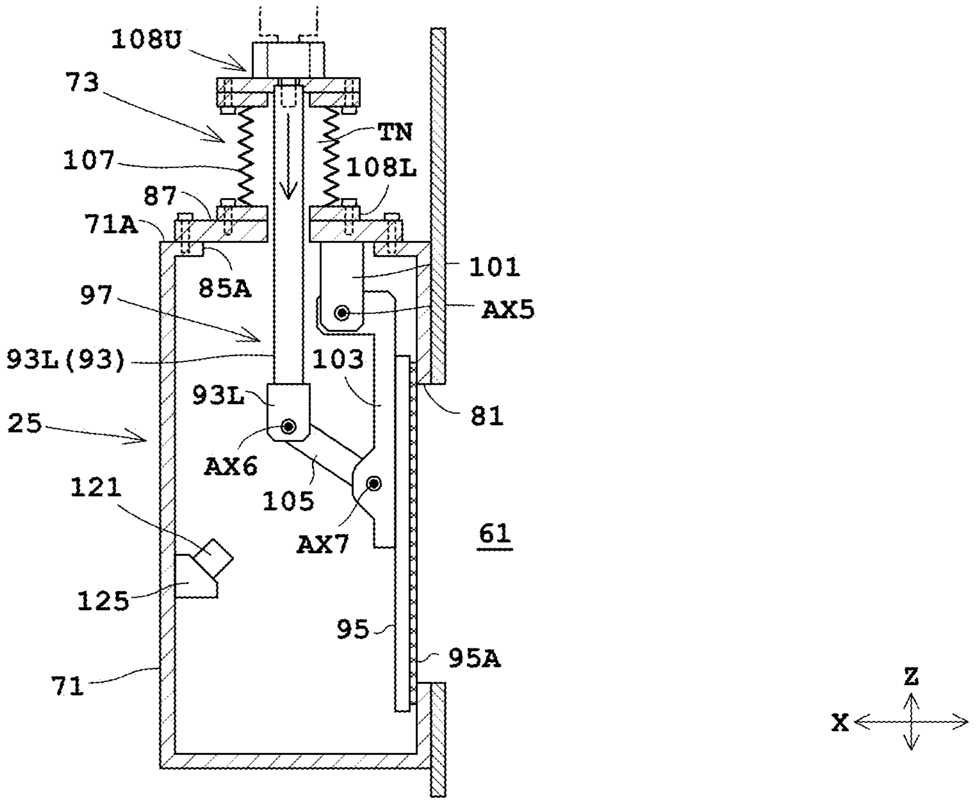
FIG. 6A is a longitudinal cross-sectional view illustrating the opening/closing mechanism when a lid member is in a closed state.
Figure 6B:
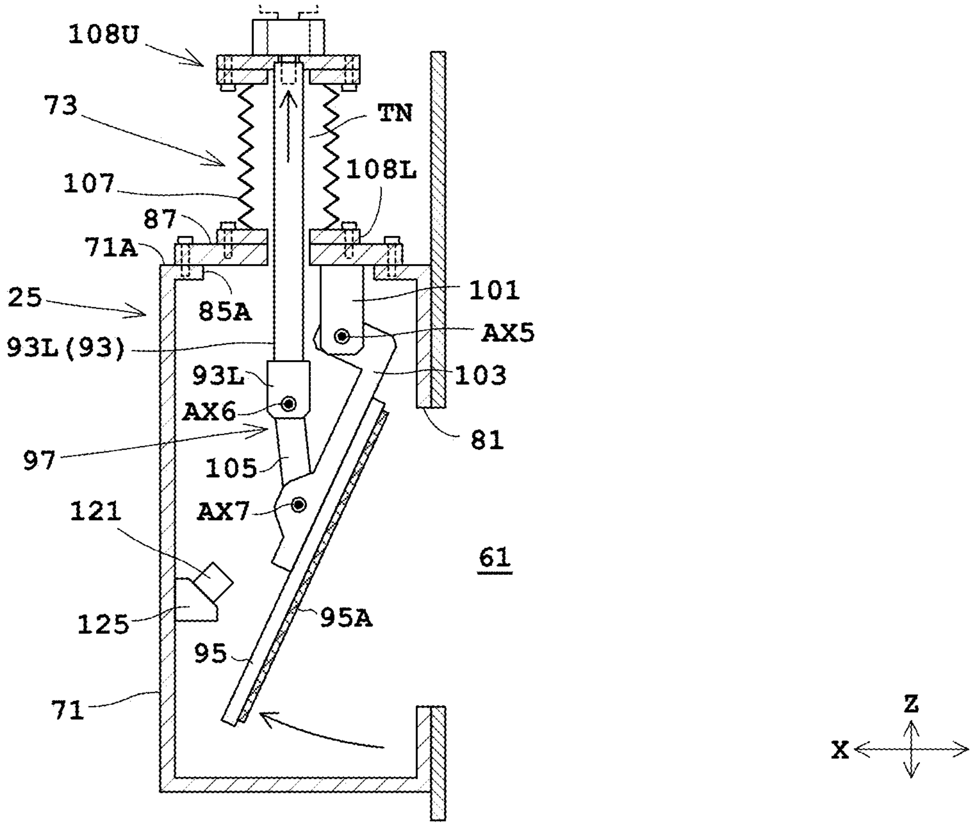
FIG. 6B is a longitudinal cross-sectional view illustrating the opening/closing mechanism when the lid member is in an open state.

Reference is made to FIGS. 5, 6A, and 6B. The link mechanism 97 is provided on a lower surface of the base member 87. The link mechanism 97 converts linear movement of the rod 93 extending from the actuator 91 in the vertical direction Z into opening/closing operation (swinging) of the lid member 95 about a horizontal axis AX5. The link mechanism 97 includes a lower support member 101, a first link 103, and a second link 105. The lower support member 101 is provided on the lower surface of the base member 87. That is, the lower support member 101 is fixed to the lower surface of the base member 87.

The horizontal axis AX5 is located at a height between the base member 87 and the lid member 95. The horizontal axis AX5 passes through a lower end portion of the lower support member 101. A horizontal axis AX6 passes through a lower end portion of the rod 93 (93L). A horizontal axis AX7 passes through a lower end side of the first link 103. The horizontal axis AX6 and the horizontal axis AX7 are each parallel to the horizontal axis AX5. That is, the three horizontal axes AX5, AX6, and AX7 each extend in the width direction Y. Furthermore, in the closed state illustrated in FIG. 6A, the horizontal axis AX6 is located at a height between the two horizontal axes AX5 and AX7. Moreover, in the closed state, the horizontal axis AX5 is located between the two horizontal axes AX6 and AX7 in plan view.

An upper end portion of the first link 103 is coupled to the lower support member 101 so as to be rotatable about the horizontal axis AX5. A lower end portion of the first link 103 is coupled to a back surface of the disk-shaped lid member 95. An upper end portion of the second link 105 is coupled to the rod 93 (lower rod 93L) so as to be rotatable about the horizontal axis AX6. A lower end portion of the second link 105 is coupled to the first link 103 so as to be rotatable about the horizontal axis AX7.

Furthermore, in a portion where the lower rod 93L slides with respect to the base member 87, it is difficult to ensure airtightness. Therefore, a bellows structure is adopted for the sliding portion. This prevents leakage of gas at the sliding portion.

Reference is made to FIGS. 6A and 6B. Each of the three opening/closing mechanisms 73, 74, and 75 includes a bellows 107, a lower member 108L, and an upper member 108U. The bellows 107 extends in the vertical direction Z. A cavity TN of the bellows 107 can accommodate a part or all of the lower rod 93L. The lower member 108L is provided at a lower end of the bellows 107. The lower member 108L is attached to the upper surface of the base member 87 with, for example, a plurality of screws. The lower rod 93L penetrates the lower member 108L and the base member 87 while passing through the cavity TN of the bellows 107.

The upper member 108U is provided at an upper end of the bellows 107. The upper member 108U closes an upper end of the cavity TN. An upper end of the lower rod 93L is coupled to a lower portion of the upper member 108U.

As illustrated in FIG. 5, a lower end of the upper rod 93U is coupled to an upper portion of the upper member 108U by way of the floating joint 115. That is, the floating joint 115 is coupled to the lower end of the upper rod 93U and further coupled to the upper portion of the upper member 108U. The floating joint 115 is a joint that absorbs eccentricity and deflection angle between the upper rod 93U and the lower rod 93L.

Here, operations of the three opening/closing mechanisms 73, 74, and 75 will be briefly described. As shown in FIG. 6B, the actuator 91 moves the rod 93 (upper rod 93U and lower rod 93L) upward. As a result, the lid member 95 is brought into an open state for allowing the gas from the processing chamber 23 to flow. When the lid member 95 of the first opening/closing mechanism 73 is in the open state, the first communication port 81 is opened. Similarly, when the lid member 95 of the second opening/closing mechanism 74 is in the open state, the second communication port 82 is opened. Furthermore, when the lid member 95 of the third opening/closing mechanism 75 is in the open state, the third communication port 83 is opened.

As illustrated in FIG. 6A, the actuator 91 moves the rod 93 downward. As a result, the lid member 95 is brought into a closed state for blocking gas from the processing chamber 23. When the lid member 95 of the first opening/closing mechanism 73 is in the closed state, the first communication port 81 is closed. Similarly, when the lid member 95 of the second opening/closing mechanism 74 is in the closed state, the second communication port 82 is closed. Furthermore, when the lid member 95 of the third opening/closing mechanism 75 is in the closed state, the third communication port 83 is closed. Note that each of the opening/closing mechanisms 73, 74, and 75 illustrated in FIG. 5 is in the closed state.

<3-3-1. Three Cleaning Nozzles>

Next, three cleaning nozzles 121, 122, 123, which are characteristic portions of the present example, will be described. For example, when crystals (salts) are generated by mixing an acidic chemical solution atmosphere and an alkaline chemical solution atmosphere, there is a possibility that the operation of the link mechanism 97 that moves the lid member 95 is hindered. In addition, the crystal adhered to each of the packing 95A and a contact portion thereof may hinder the opening/closing operation of the lid member 95. Therefore, the cleaning liquid is injected (ejected) to the link mechanism 97 (particularly, the joint portion), the packing 95A, and the contact portion of the packing 95A. Accordingly, for example, at least one of the chemical solution and the crystal adhered to the link mechanism 97 is cleaned away.

Figure 7:
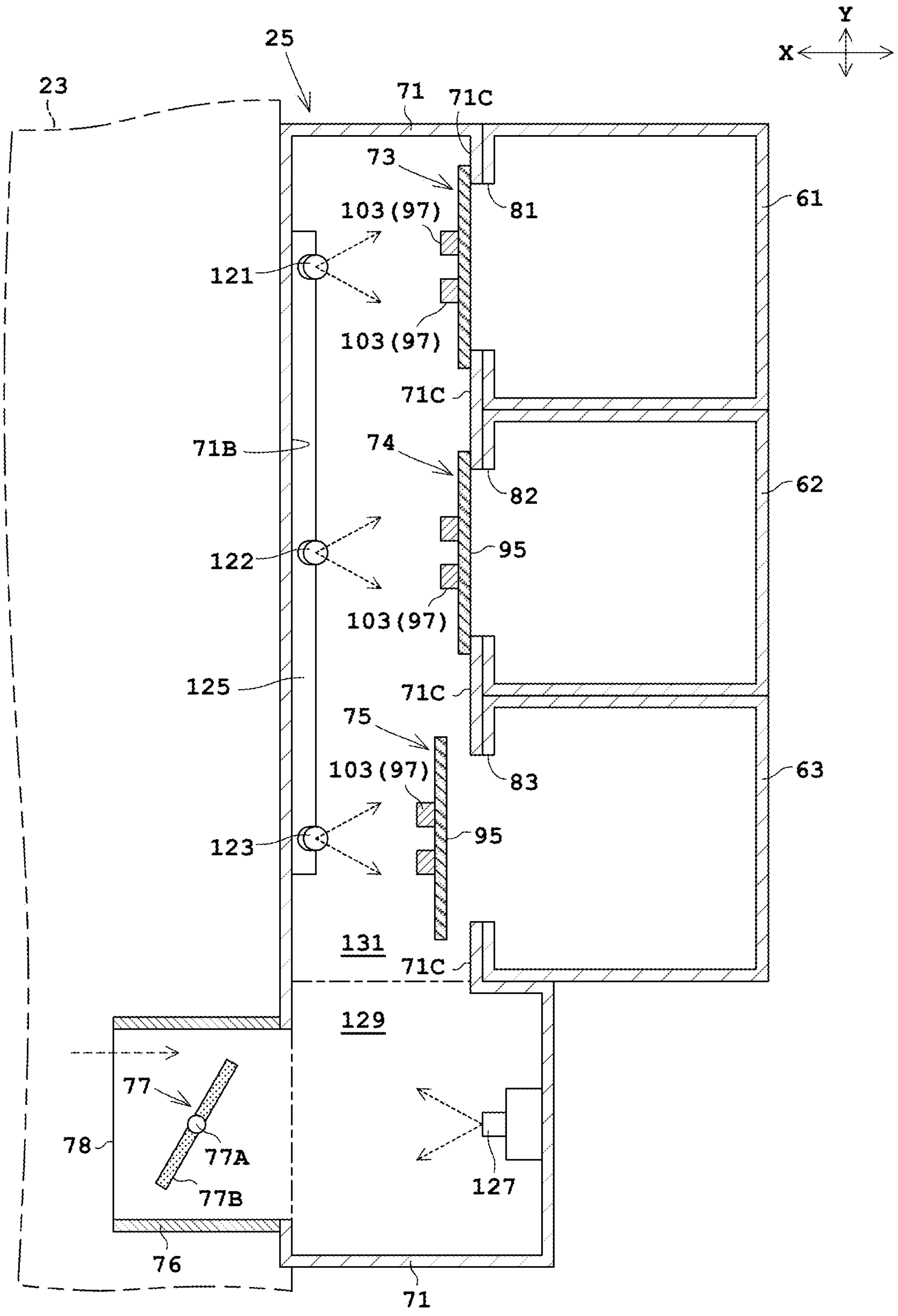
FIG. 7 is a transverse cross-sectional view illustrating a state in which three cleaning nozzles are provided on an inner side of the switching box.
Figure 8:
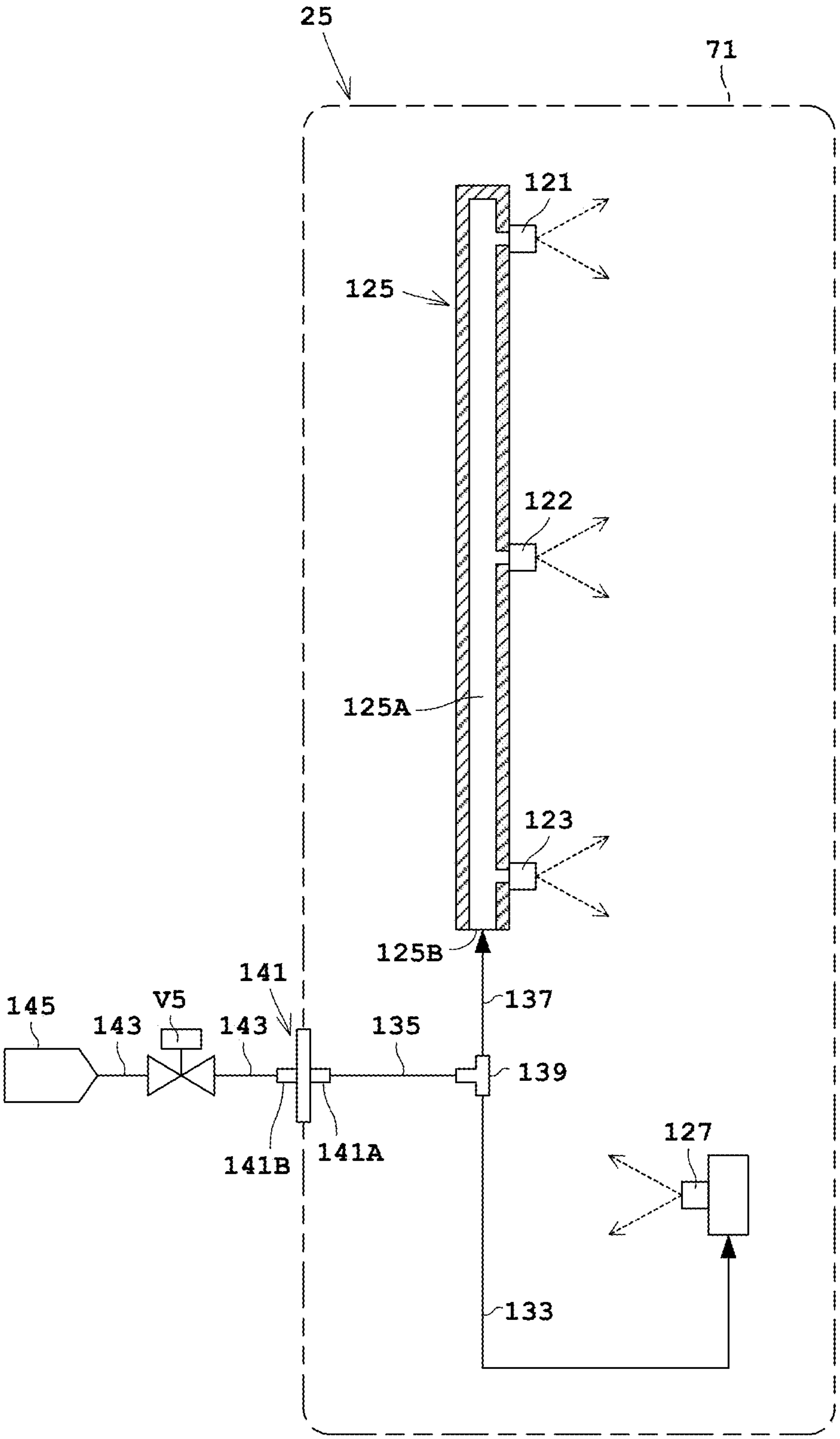
FIG. 8 is a diagram illustrating an outline of piping routes to the three cleaning nozzles.

FIG. 7 is a transverse cross-sectional view illustrating a state in which three cleaning nozzles 121, 122, and 123 are provided on the inner side of the switching box 71. FIG. 8 is a view illustrating an outline of piping routes to the three cleaning nozzles 121, 122, and 123. The exhaust switching mechanism 25 further includes three cleaning nozzles 121, 122, 123, a nozzle attachment member 125, and a control damper cleaning nozzle 127. The three cleaning nozzles 121, 122, 123, the nozzle attachment member 125, and the control damper cleaning nozzle 127 are provided on the inner side of the switching box 71. Each of the three cleaning nozzles 121, 122, 123 injects cleaning liquid.

Three cleaning nozzles 121, 122, 123 are attached to the nozzle attachment member 125. The nozzle attachment member 125 is a rod-shaped member extending in the width direction Y. As illustrated in FIG. 7, the switching box 71 includes an introduction portion 129 adjacent to the connecting pipe 76 and a distribution portion 131 extending from the introduction portion 129 along the three exhaust pipes 61, 62, and 63 in the width direction Y.

The nozzle attachment member 125 is disposed in the distribution portion 131. The nozzle attachment member 125 is disposed at or near the side wall 71B facing the three communication ports 81, 82, and 83. The side wall 71B is adjacent to the processing chamber 23. As shown in FIG. 8, the nozzle attachment member 125 has a cleaning liquid flow path 125A for feeding the cleaning liquid on an inner side, and has a common inlet 125B. The cleaning liquid flow path 125A also extends in the width direction Y. The cleaning liquid flow path 125A is branched to send the cleaning liquid supplied from the common inlet 125B to the three cleaning nozzles 121, 122, and 123. The three cleaning nozzles 121, 122, 123 communicate with the cleaning liquid flow path 125A.

The control damper cleaning nozzle 127 injects the cleaning liquid toward the exhaust control damper 77. As a result, at least one of the chemical solution and the crystal adhered to the exhaust control damper 77 can be cleaned away. As shown in FIG. 8, the exhaust switching mechanism 25 further includes three cleaning liquid pipings 133, 135, 137, a branch pipe 139, and a pipe joint 141. The three cleaning liquid pipings 133, 135, 137 and the branch pipe 139 are provided on the inner side of the switching box 71. The branch pipe 139 is, for example, a T-shaped pipe.

One end of the cleaning liquid piping 133 is connected to the control damper cleaning nozzle 127, and the other end of the cleaning liquid piping 133 is connected to the branch pipe 139. One end of the cleaning liquid piping 135 is connected to the branch pipe 139, and the other end of the cleaning liquid piping 135 is connected to an inner connecting portion 141A of the pipe joint 141. The pipe joint 141 is attached to a wall portion (for example, the ceiling wall 71A) of the switching box 71. The inner connecting portion 141A is disposed on the inner side of the switching box 71. An outer connecting portion 141B of the pipe joint 141 is disposed on the outer side of the switching box 71.

The cleaning liquid piping 137 branches from the cleaning liquid pipings 133, 135. One end of the cleaning liquid piping 137 is connected to the branch pipe 139, and the other end of the cleaning liquid pipe 137 is connected to the inlet 125B of the nozzle attachment member 125. One end of the cleaning liquid piping 143 is connected to the outer connecting portion 141B of the pipe joint 141. The other end of the cleaning liquid piping 143 is connected to a cleaning liquid supply source 145. The cleaning liquid supply source 145 supplies a cleaning liquid. As the cleaning liquid, for example, carbon dioxide water ($CO_2$ water) is used, but the cleaning liquid is not limited thereto. For example, the cleaning liquid may be pure water such as deionized water (DIW).

The cleaning liquid piping 143 is provided with an open/close valve V5. The open/close valve V5 supplies and stops the supply of the cleaning liquid. When the open/close valve V5 is opened, the cleaning liquid is sent from the cleaning liquid supply source 145 to the three cleaning nozzles 121, 122, 123 and the control damper cleaning nozzle 127. As a result, the cleaning liquid is injected from the three cleaning nozzles 121, 122, 123 and the control damper cleaning nozzle 127.

Each of the three cleaning nozzles 121, 122, 123 and the control damper cleaning nozzle 127 injects mist-like cleaning liquid. Each of the three cleaning nozzles 121, 122, 123 and the control damper cleaning nozzle 127 includes a one-fluid nozzle that injects only the cleaning liquid. The one-fluid nozzle makes the cleaning liquid into a mist form by the pressure of the cleaning liquid without using gas. Each of the three cleaning nozzles 121, 122, 123 and the control damper cleaning nozzle 127 may be constituted by a two-fluid nozzle. The two-fluid nozzle makes the cleaning liquid into a mist form by fining the cleaning liquid using a flow of gas (for example, nitrogen gas).

Figure 9A:
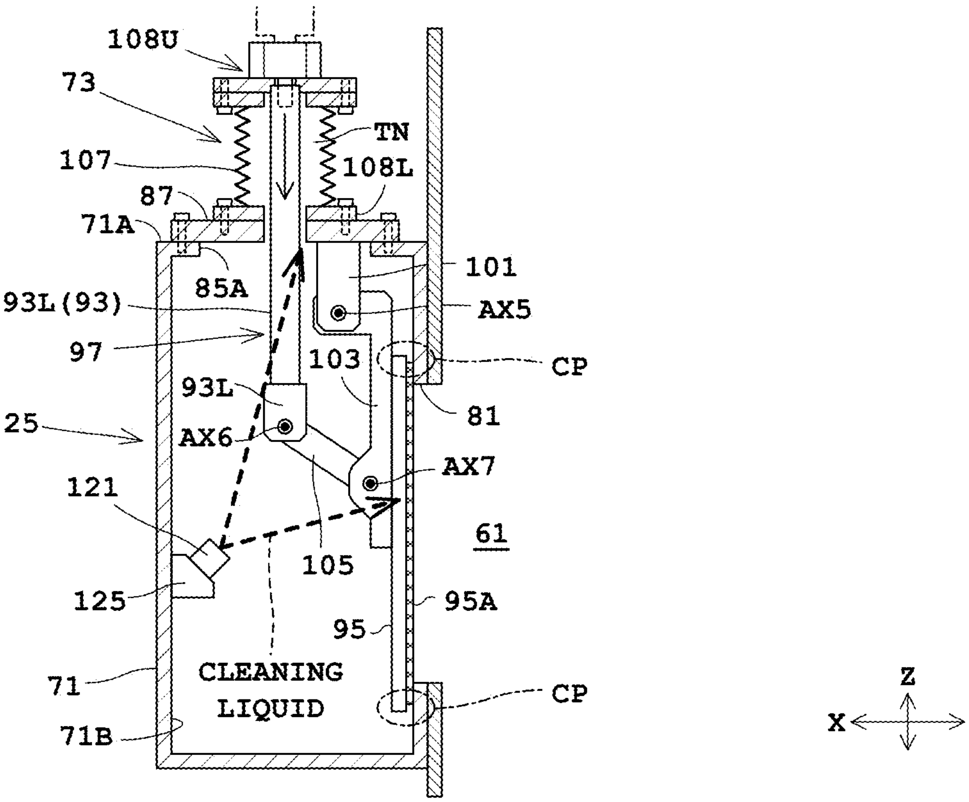
FIGS. 9A and 9B are longitudinal cross-sectional views for explaining a cleaning operation of the opening/closing mechanism by the cleaning nozzle.
Figure 9B:
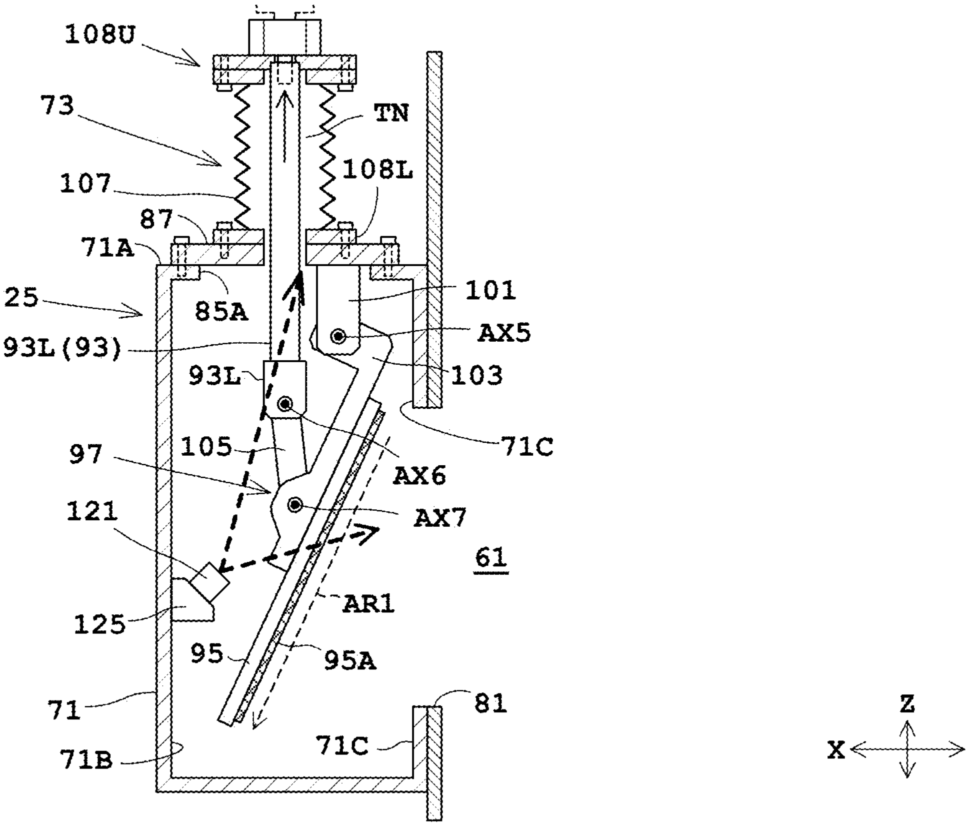
Figure 10:
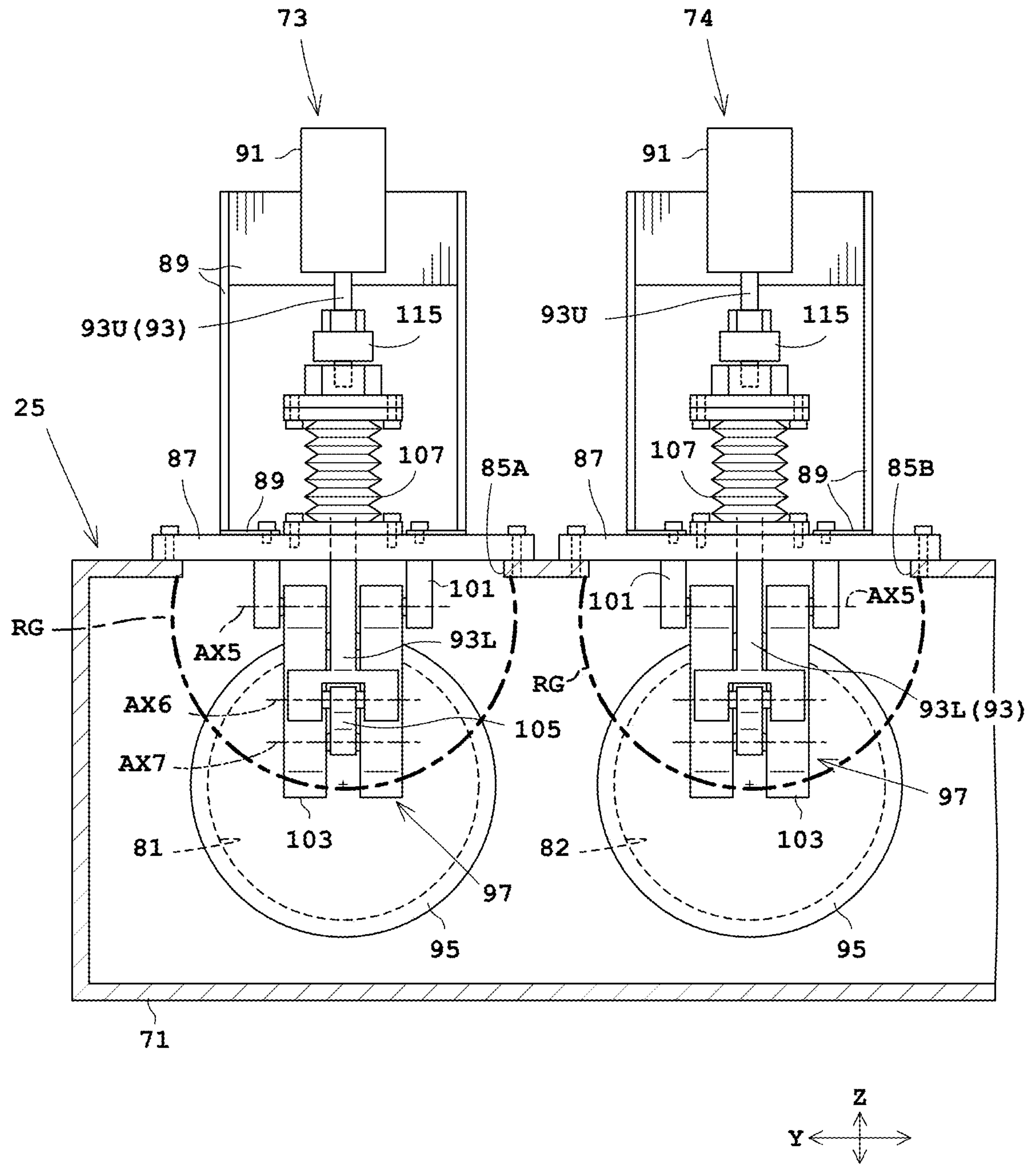
FIG. 10 is a longitudinal cross-sectional view for explaining an injection range of the cleaning nozzle.

For example, each of the three cleaning nozzles 121, 122, 123 is provided so as to face obliquely upward from a height position lower than the link mechanism 97. Specifically, as shown in FIGS. 9A, 9B, and 10, the first cleaning nozzle 121 is provided so as to face the link mechanism 97 of the first opening/closing mechanism 73. The first cleaning nozzle 121 directly injects the cleaning liquid to the link mechanism 97 of the first opening/closing mechanism 73 such that an upper end of the lid member 95 of the first opening/closing mechanism 73 is included in an injection range RG of the cleaning liquid.

Similarly, the second cleaning nozzle 122 is provided so as to face the link mechanism 97 of the second opening/closing mechanism 74. The second cleaning nozzle 122 directly injects the cleaning liquid to the link mechanism 97 of the second opening/closing mechanism 74 such that an upper end of the lid member 95 of the second opening/closing mechanism 74 is included in an injection range RG of the cleaning liquid. The third cleaning nozzle 123 is provided so as to face the link mechanism 97 of the third opening/closing mechanism 75. The third cleaning nozzle 123 directly injects the cleaning liquid to the link mechanism 97 of the third opening/closing mechanism 75 such that an upper end of the lid member 95 of the third opening/closing mechanism 75 is included in an injection range RG of the cleaning liquid.

The orientation and the injection range (injection angle) RG of each cleaning nozzle 121, 122, 123 are set in advance with reference to the closed state illustrated in FIG. 9A. For example, as illustrated in FIG. 10, the width of the injection range RG in the horizontal direction may be set to be larger than the diameter of the lid member 95.

The cleaning liquid pipings 133, 135 correspond to the first cleaning liquid piping of the present invention. The cleaning liquid piping 137 corresponds to the second cleaning liquid piping of the present invention. Furthermore, the first cleaning nozzle 121 corresponds to first opening/closing mechanism 73. Similarly, the second cleaning liquid nozzle 122 corresponds to the second opening/closing mechanism 74, and the third cleaning liquid nozzle 123 corresponds to the third opening/closing mechanism 75.

<4. Control Unit>

The substrate processing device 1 includes a control unit 150 (see FIG. 1) and a storage unit (not illustrated). The control unit 150 controls each configuration of the substrate processing device 1. The control unit 150 includes one or more processors such as a central processing unit (CPU). The storage unit includes, for example, at least one of a read-only memory (ROM) and a random-access memory (RAM). The storage unit stores a computer program necessary for controlling each configuration of the substrate processing device 1.

<5. Normal Operation of Substrate Processing Device 1>

Next, a normal operation of the substrate processing device 1 will be described. Reference is now made to FIG. 1. The carrier C is placed on the load port LP. The indexer robot IR takes out the substrate W from the carrier C placed on the load port LP and transports the substrate W to the substrate placing portion PS. The transport robot TR of the processing block 3 takes out the substrate W from the substrate placing portion PS, and transports the substrate W to a predetermined processing chamber 23 among the twenty-four processing chambers 23 (processing units 21).

The fan filter unit 31 illustrated in FIG. 4 supplies clean air into the processing chamber 23. In addition, the exhaust facility of the factory takes in gas from one end of each of the six horizontal exhaust pipes 65A, 66A, 67A, 65B, 66B, and 67B. For example, in the exhaust switching mechanism 25 illustrated in FIGS. 3 and 5, the two opening/closing mechanisms 73 and 74 close the two communication ports 81 and 82, and the third opening/closing mechanism 75 opens the third communication port 83. Therefore, the gas in the processing chamber 23 is sent to the exhaust facility of the factory via the third communication port 83, the third exhaust pipe 63, and the horizontal exhaust pipe 67A.

For example, the first exhaust pipe 61 is used for exhausting an acidic gas. The second exhaust pipe 62 is used for exhausting an alkaline gas. The third exhaust pipe 63 is used for exhausting an organic gas. Furthermore, for example, the second exhaust pipe 62 may be used for exhausting an organic gas, and the third exhaust pipe 63 may be used for exhausting an alkaline gas. The role of the three exhaust pipes 61, 62, and 63 is not limited.

For example, a case where an acidic chemical solution (first chemical solution) is supplied from the first nozzle 29A to the substrate W to perform chemical solution treatment will be described. In this case, in the exhaust switching mechanism 25 illustrated in FIGS. 3 and 5, the first opening/closing mechanism 73 opens the first communication port 81, and the two opening/closing mechanisms 74 and 75 close the two communication ports 82 and 83. As a result, the gas in the processing chamber 23 is sent to the connecting pipe 76 (exhaust inlet 78), the switching box 71, and the first exhaust pipe 61 in this order. Therefore, the gas containing the mist (or vapor) of the acidic chemical solution generated by the chemical solution treatment is sent to the first exhaust pipe 61 through the switching box 71.

In addition, a case where an alkaline chemical solution (second chemical solution) is supplied from the second nozzle 29B to the substrate W to perform the chemical solution treatment will be described. In this case, in the exhaust switching mechanism 25 illustrated in FIGS. 3 and 5, the second opening/closing mechanism 74 opens the second communication port 82, and the two opening/closing mechanisms 73 and 75 close the two communication ports 81 and 83. As a result, the gas in the processing chamber 23 is sent to the connecting pipe 76 (exhaust inlet 78), the switching box 71, and the second exhaust pipe 62 in this order. Therefore, the gas containing the mist (or vapor) of the alkaline chemical solution generated by the chemical solution treatment is sent to the second exhaust pipe 62 through the switching box 71.

A case where an organic chemical solution (third chemical solution) is supplied from the third nozzle 29C to the substrate W to perform the chemical solution treatment will be described. In this case, in the exhaust switching mechanism 25 illustrated in FIGS. 3 and 5, the third opening/closing mechanism 75 opens the third communication port 83, and the two opening/closing mechanisms 73 and 74 close the two communication ports 81 and 82. As a result, the gas in the processing chamber 23 is sent to the connecting pipe 76 (exhaust inlet 78), the switching box 71, and the third exhaust pipe 63 in this order. Therefore, the gas containing the mist (or vapor) of the organic chemical solution generated by the chemical solution treatment is sent to the third exhaust pipe 63 through the switching box 71.

After the substrate W is subjected to the predetermined chemical solution treatment, the transport robot TR transports the substrate W from the processing chamber 23 to the substrate placing portion PS. The indexer robot IR transports the substrate W subjected to the chemical solution treatment from the substrate placing portion PS to the carrier C placed in the load port LP.

<6. Maintenance Operation for Substrate Processing Device 1>

Next, as a maintenance operation for the substrate processing device 1, a cleaning operation of the three opening/closing mechanisms 73, 74, and 75 will be described. This cleaning operation is performed when the processing chamber 23 is not performing the substrate processing, that is, when the substrate W is not being carried into the processing chamber 23. Furthermore, the cleaning operation is performed every time the substrate processing device 1 processes a preset number (or lot) of substrates W, or every time a preset number of days or time elapses.

Figure 11:
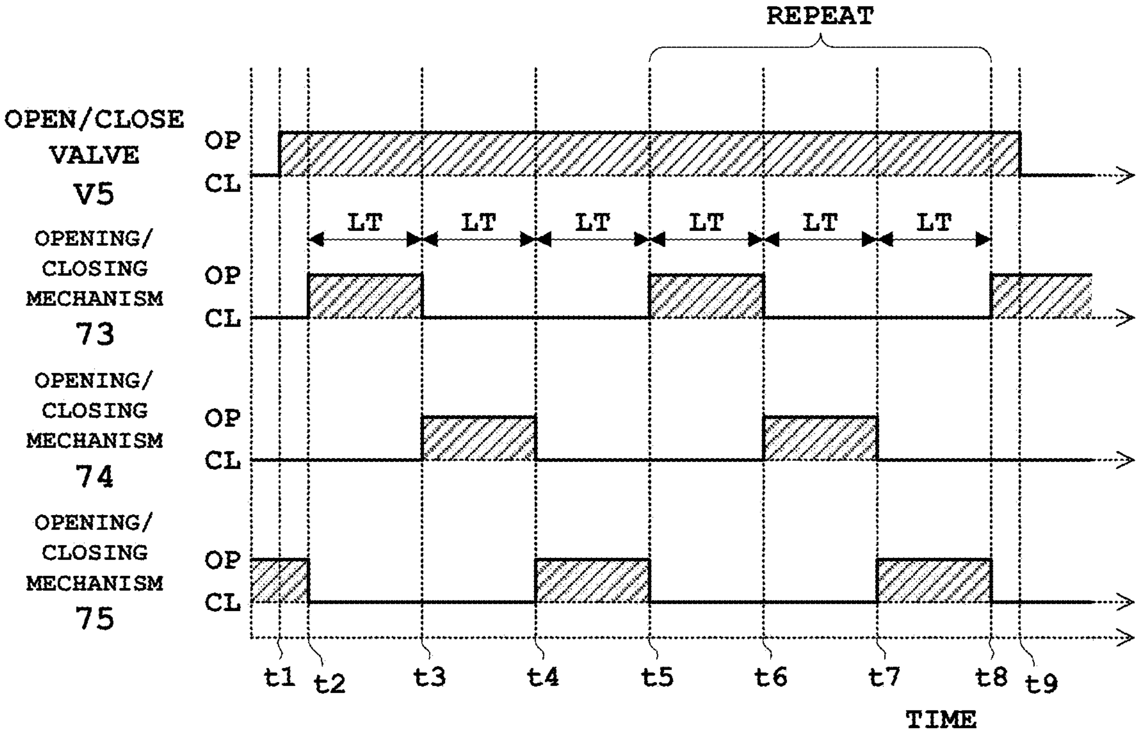
FIG. 11 is a timing chart illustrating a cleaning operation of the three opening/closing mechanisms.

FIG. 11 is a timing chart illustrating a cleaning operation of the three opening/closing mechanisms 73, 74, and 75. During the cleaning operation, any one of the three lid members 95 of the three opening/closing mechanisms 73, 74, 75 is always opened to maintain cleanliness in the processing chamber 23. In addition, the fan filter unit 31 illustrated in FIG. 4 supplies clean air, and the exhaust facility of the factory takes in the gas in the three exhaust pipes 61, 62, and 63.

At the time point t1, when the open/close valve V5 illustrated in FIG. 8 is opened, the mist-like cleaning liquid is injected from the three cleaning nozzles 121, 122, 123 and the control damper cleaning nozzle 127. The open/close valve V5 is opened from time point t1 to time point 19. At time point t1, for example, it is assumed that the opening/closing mechanisms 73 and 74 close the communication ports 81 and 82, and the third opening/closing mechanism 75 opens the third communication port 83. For example, as shown in FIG. 9A, first cleaning nozzle 121 injects mist-like cleaning liquid.

The injected mist-like cleaning liquid hits the three joint portions while wrapping around a shielding object. Note that the three joint portions are a joint portion of the lower rod 93L and the second link 105 through which the horizontal axis AX6 passes, a joint portion of the first link 103 and the second link 105 through which the horizontal axis AX7 passes, and a joint portion of the lower support member 101 and the first link 103 through which the horizontal axis AX5 passes. Furthermore, since the first cleaning nozzle 121 is directed toward the link mechanism 97 of the first opening/closing mechanism 73, a large amount of cleaning liquid is supplied to the three joint portions in a concentrated manner. Furthermore, for example, when the mist-like cleaning liquid adheres to the lower rod 93L, the mist-like cleaning liquid becomes large droplets of cleaning liquid, and the droplets flow down along the lower rod 93L and the like. Thus, the link mechanism 97 can be efficiently cleaned by the directly adhered cleaning liquid and the cleaning liquid flowing from the upper side.

When the mist-like cleaning liquid adheres to the side wall 71C on the first communication port 81 side of the switching box 71, the mist-like cleaning liquid becomes large droplets of cleaning liquid, and the droplets flow down along the side wall 71C. At this time, the droplets of cleaning liquid flow down along an outer periphery of the ring-shaped packing 95A interposed between the lid member 95 and the side wall 71C. Therefore, a peripheral portion of the packing 95A indicated by reference sign CP in FIG. 9A can be cleaned. Note that cleaning of the second opening/closing mechanism 74 by the second cleaning nozzle 122 is also performed like the cleaning by the first cleaning nozzle 121.

At time point t1, the third cleaning nozzle 123 injects the mist-like cleaning liquid as shown in FIG. 9B. Similarly, the injected mist-like cleaning liquid hits the three joint portions while wrapping around the shielding object. Furthermore, for example, the mist-like cleaning liquid adhered to the lower rod 93L becomes large droplets, and the droplets flow down along the lower rod 93L and the like. Thus, the link mechanism 97 can be efficiently cleaned.

The third opening/closing mechanism 75 opens the third communication port 83. Therefore, the injected mist-like cleaning liquid flows around the lid member 95 and hits the surface (front surface) of the lid member 95 facing the third communication port 83 and the packing 95A. Furthermore, when the mist-like cleaning liquid adheres to the surface of the lid member 95 and the packing 95A, a large droplet of the cleaning liquid is formed. Furthermore, as indicated by an arrow AR1, droplets of the cleaning liquid flow down along the surface of the lid member 95 and the packing 95A. Moreover, when the mist-like cleaning liquid adheres to the side wall 71C in the switching box 71, large droplets of cleaning liquid are formed, and the droplets flow down along the side wall 71C. Thus, the contact surface between the packing 95A and the side wall 71C can also be cleaned. The cleaning liquid is supplied, in a concentrated manner, to the link mechanism 97, the surface of the lid member 95, the packing 95A, and the like. Therefore, the contact surface between the packing 95A and the side wall 71C and the like can be efficiently cleaned.

As shown in FIG. 11, when the mist-like cleaning liquid is injected from the three cleaning nozzles 121, 122, 123, the state in which one of the three communication ports 81, 82, and 83 is opened is sequentially switched among the three communication ports 81, 82, and 83 by operating the three opening/closing mechanisms 73, 74, and 75.

At time point t2, the third opening/closing mechanism 75 closes the third communication port 83, and the first opening/closing mechanism 73 opens the first communication port 81. As a result, the first opening/closing mechanism 73 is cleaned in the open state, and the opening/closing mechanisms 74 and 75 are cleaned in the closed state. A length LT between the time points t2 and t3 is, for example, 5 seconds. The length LT between the time points t3 and t4 and between the time points t5 and t6 is also 5 seconds.

At time point t3, the first opening/closing mechanism 73 closes the first communication port 81, and the second opening/closing mechanism 74 opens the second communication port 82. As a result, the second opening/closing mechanism 74 is cleaned in the open state, and the opening/closing mechanisms 73 and 75 are cleaned in the closed state. Similarly, at time point t4, the second opening/closing mechanism 74 closes the second communication port 82, and the third opening/closing mechanism 75 opens the third communication port 83. As a result, the third opening/closing mechanism 75 is cleaned in the open state, and the opening/closing mechanisms 73 and 74 are cleaned in the closed state.

In addition, the operation between the time points t5 and t8 is the same as the operation between the time points t2 and t5. Furthermore, the operation between the time points t5 and t8 is repeated one or more times until the open/close valve V5 is closed. Note that the repetition period (between time points t5 and t8) may be omitted. Thereafter, at time point 19, the open/close valve V5 is closed. As a result, the cleaning operation of the three opening/closing mechanisms 73, 74, and 75 ends.

Next, discharge of the cleaning liquid will be described. A large amount of cleaning liquid is supplied into the switching box 71 by the three cleaning nozzles 121, 122, 123 and the control damper cleaning nozzle 127. As illustrated in FIG. 4, a bottom surface 71D on the inner side of the switching box 71 is configured to be higher than a bottom surface 23D on an inner side of the processing chamber 23. The bottom surface 71D is configured to have substantially the same height as a bottom surface 76D on an inner side of the connecting pipe 76. Therefore, the cleaning liquid collected on the bottom surface 71D in the switching box 71 flows to the bottom surface 23D in the processing chamber 23 lower than the bottom surface 71D in the switching box 71. In addition, it is possible to prevent liquid such as cleaning liquid from entering the switching box 71 from the processing chamber 23. The cleaning liquid that flowed to the bottom surface 23D in the processing chamber 23 is discharged from a liquid discharge pipe 53 (see FIG. 4) provided at a bottom portion of the processing chamber 23.

For example, when the third opening/closing mechanism 75 opens the third communication port 83, the cleaning liquid may be discharged from the third communication port 83. As illustrated in FIG. 2, liquid discharge pipes 147 are connected to the bottom portions of the three exhaust pipes 61, 62, and 63 so as to be able to discharge liquid such as a processing liquid.

According to the present embodiment, the first cleaning nozzle 121 is provided so as to face the link mechanism 97 of the first opening/closing mechanism 73. The first cleaning nozzle 121 directly injects the cleaning liquid to the link mechanism 97 of the first opening/closing mechanism 73. Similarly, the second cleaning nozzle 122 is provided so as to face the link mechanism 97 of the second opening/closing mechanism 74. Furthermore, the second cleaning nozzle 122 directly injects the cleaning liquid to the link mechanism 97 of the second opening/closing mechanism 74. As a result, a relatively large amount of cleaning liquid can be supplied to the link mechanism 97. Therefore, at least one of the chemical solution and the crystal adhering to the link mechanism 97 can be cleaned away. Thus, the link mechanism 97 (opening/closing mechanisms 73 and 74) can be efficiently cleaned.

When the upper end of the lid member 95 is included in the injection range (injection angle) RG of the cleaning liquid, a relatively large amount of cleaning liquid can be supplied to the upper end of the lid member 95. Therefore, for example, the droplet of the cleaning liquid adhered to the upper end of the lid member 95 flows down along the lid member 95 from the upper end of the lid member 95. Thus, the lid member 95 can be cleaned. Therefore, for example, the outer edge portion (see reference numeral CP in FIG. 9A) of the lid member 95 can be cleaned. Thus, the opening/closing operation of the lid member 95 can be prevented from being hindered.

Furthermore, all three cleaning nozzles 121, 122, 123 are attached to nozzle attachment member 125 having the common inlet 125B. Therefore, the piping may not be individually provided in the three cleaning nozzles 121, 122, 123. Therefore, a proportion of the supply path of the cleaning liquid occupying a space in the switching box 71 can be suppressed. In addition, the supply path of the cleaning liquid can be simply configured.

The cleaning liquid piping 137 through which the cleaning liquid is sent to the three cleaning nozzles 121, 122, 123 is branched from the cleaning liquid pipings 133,135 through which the cleaning liquid is sent to the control damper cleaning nozzle 127. As a result, the proportion of the supply path of the cleaning liquid occupying the space in the switching box 71 can be suppressed. In addition, the supply path of the cleaning liquid can be simply configured.

Each of the cleaning nozzles 121, 122, 123 is configured by a one-fluid nozzle. When each cleaning nozzle 121, 122, 123 is a two-fluid nozzle, it is necessary to send gas, in addition to the cleaning liquid, to the two-fluid nozzle. As a result, a piping for sending gas needs to be provided. According to the present example, piping is unnecessary for sending this gas.

Second Example

Figure 12:
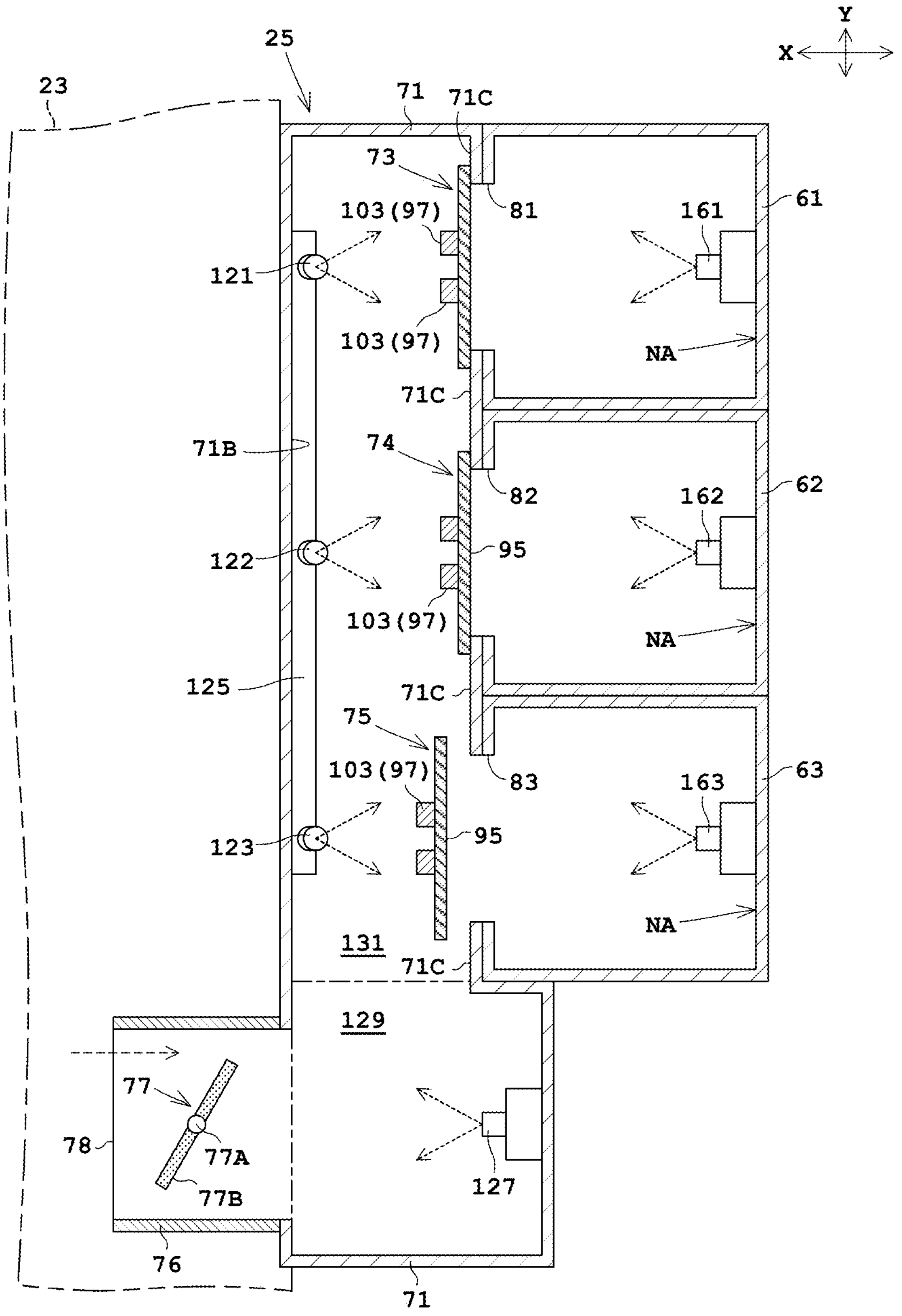
FIG. 12 is a transverse cross-sectional view illustrating a state in which three exhaust pipe side cleaning nozzles according to the second example are provided on an inner side of three exhaust pipes.
Figure 13A:
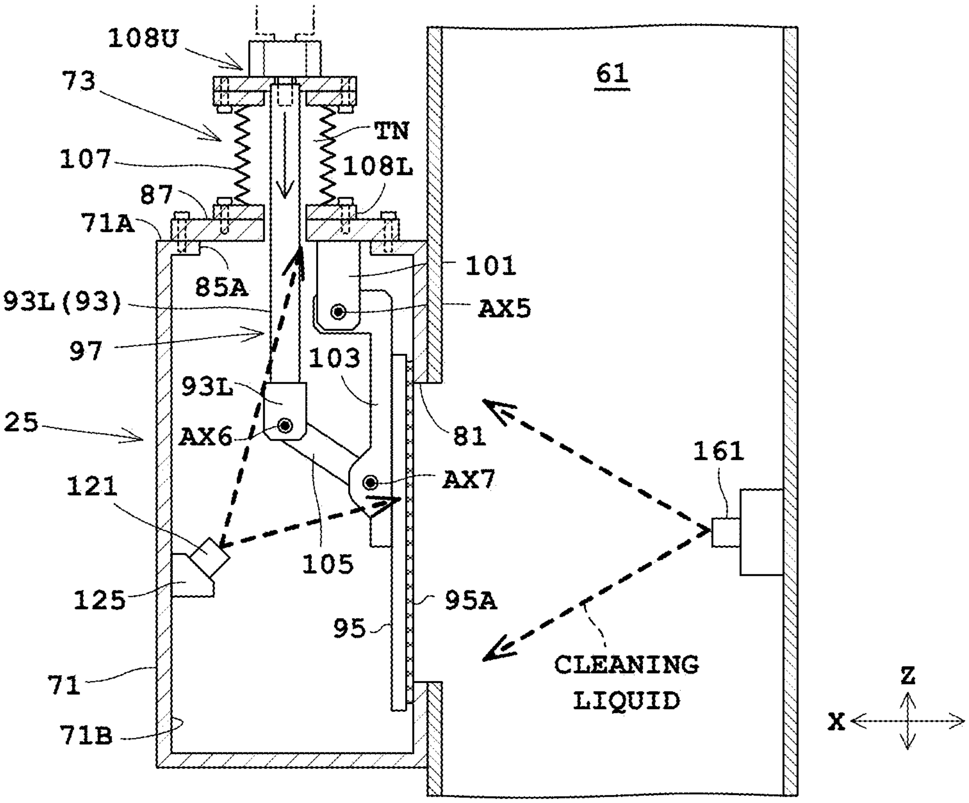
FIGS. 13A and 13B are longitudinal cross-sectional views for explaining a cleaning operation of the opening/closing mechanism by the exhaust pipe side cleaning nozzle.
Figure 13B:
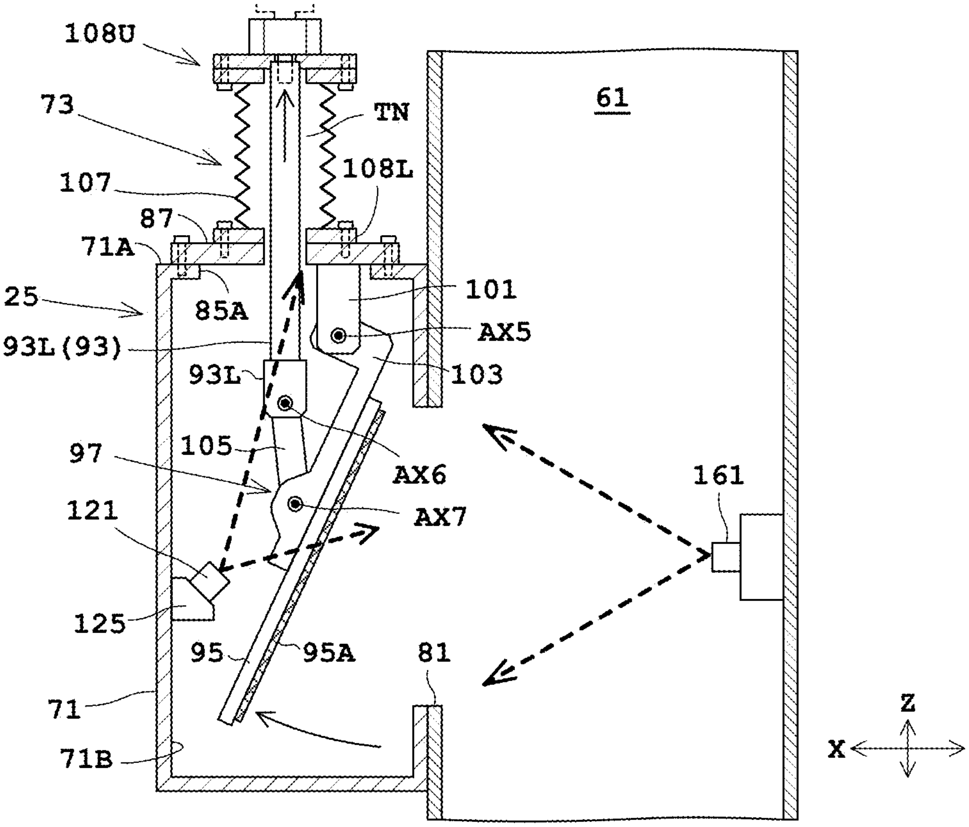

Next, a second example of the present invention will be described with reference to the drawings. Note that the description redundant with the first example will be omitted. FIG. 12 is a transverse cross-sectional view illustrating a state in which three exhaust pipe side cleaning nozzles 161, 162, 163 according to the second example are provided on inner sides of the three exhaust pipes 61, 62, 63. FIGS. 13A and 13B are longitudinal cross-sectional views for explaining a cleaning operation of the first opening/closing mechanism 73 by the exhaust pipe side cleaning nozzle 161.

In the first example, three cleaning nozzles 121, 122, 123 are provided to clean the three opening/closing mechanisms 73, 74, and 75. In this regard, in the second example, three exhaust pipe side cleaning nozzles 161, 162, 163 are further provided.

As illustrated in FIG. 12, the three exhaust pipe side cleaning nozzles 161, 162, 163 are provided in the three exhaust pipes 61, 62, and 63, respectively. That is, the first exhaust pipe side cleaning nozzle 161 is provided on the inner side of the first exhaust pipe 61. The first exhaust pipe side cleaning nozzle 161 is provided on an inner wall NA facing the first communication port 81. The second exhaust pipe side cleaning nozzle 162 is provided on the inner side of the second exhaust pipe 62. The second exhaust pipe side cleaning nozzle 162 is provided on an inner wall NA facing the second communication port 82. The third exhaust pipe side cleaning nozzle 163 is provided on the inner side of the third exhaust pipe 63. The third exhaust pipe side cleaning nozzle 163 is provided on an inner wall NA facing the third communication port 83.

The first exhaust pipe side cleaning nozzle 161 injects mist-like cleaning liquid to the lid member 95 of the first opening/closing mechanism 73 through the first communication port 81. Similarly, the second exhaust pipe side cleaning nozzle 162 injects the cleaning liquid to the lid member 95 of the second opening/closing mechanism 74 through the second communication port 82. The third exhaust pipe side cleaning nozzle 163 injects the cleaning liquid to the lid member 95 of the third opening/closing mechanism 75 through the third communication port 83.

Each of the three exhaust pipe side cleaning nozzles 161, 162, 163 includes one-fluid nozzle, but may include two-fluid nozzles. For example, each of the three exhaust pipe side cleaning nozzles 161, 162, 163 may be disposed slightly upward. As a result, it is easy to directly inject the mist-like cleaning liquid to the upper end of the surface (front surface) of the lid member 95. For example, the cleaning liquid from the cleaning liquid supply source 145 may be supplied to each of the three exhaust pipe side cleaning nozzles 161, 162, 163 through a piping (not illustrated). The three exhaust pipe side cleaning nozzles 161, 162, 163 inject the cleaning liquid when the three cleaning nozzles 121, 122, 123 are injecting the cleaning liquid.

Effects of the present example will be described. For example, the first cleaning nozzle 121 is provided on the inner side of the switching box 71. Therefore, even if the first communication port 81 is opened, the first cleaning nozzle 121 may not be able to efficiently supply the cleaning liquid to the surface (front surface) facing the first communication port 81 of the lid member 95 of the first opening/closing mechanism 73. The same applies to the packing 95A. However, according to the present example, for example, the first exhaust pipe side cleaning nozzle 161 is provided on the inner side of the first exhaust pipe 61. Therefore, the cleaning liquid can be efficiently supplied to the surface of the lid member 95 of the first opening/closing mechanism 73. Note that the two exhaust pipe side cleaning nozzles 162, 163 also have the same effect as the first exhaust pipe side cleaning nozzle 161.

The present invention is not limited to the above embodiment, and can be modified as follows.

Figure 14:
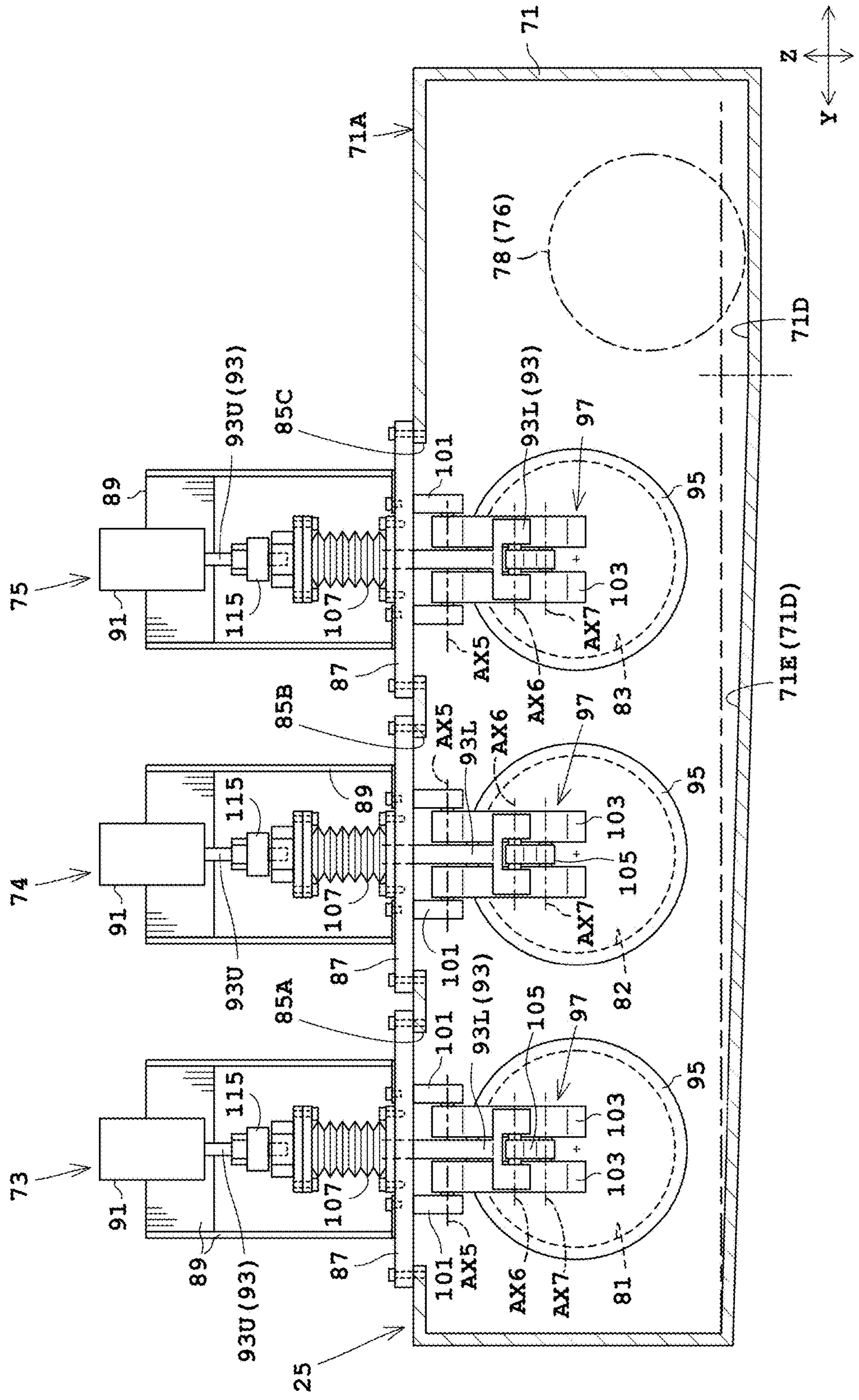
FIG. 14 is a longitudinal cross-sectional view illustrating an exhaust switching mechanism according to a modified example.

(1) In each of the examples described above, the bottom surface in the switching box 71 is not inclined and is horizontal. In this regard, the bottom surface on the inner side of the switching box 71 may be inclined so that the cleaning liquid is collected in the connecting pipe 76. That is, as illustrated in FIG. 14, the bottom surface 71D on the inner side of the switching box 71 has an inclined surface 71E. The inclined surface 71E is inclined such that the connecting pipe 76 side becomes lower. As a result, since the bottom surface on the inner side of the switching box 71 is inclined, the cleaning liquid existing on the bottom surface in the switching box 71 can be efficiently discharged from the switching box 71 through the connecting pipe 76.

(2) In each of the above-described examples and modified example (1), three exhaust pipes 61, 62, and 63 are provided on the side of the processing chamber 23. In this respect, two or four or more exhaust pipes may be provided on the side of the processing chamber 23. That is, a plurality of exhaust pipes may be provided on the side of the processing chamber 23. In this case, the same number of communication ports, opening/closing mechanisms, cleaning nozzles, exhaust pipe side cleaning nozzles, and the like as the number of the plurality of exhaust pipes are provided.

(3) In each example and each modified example described above, when the cleaning liquid is injected from the three cleaning nozzles 121, 122, 123, the state in which one of the three communication ports 81, 82, and 83 is opened is sequentially switched among the three communication ports 81, 82, and 83 by operating the three opening/closing mechanisms 73, 74, and 75. In this regard, as long as there is no problem of cleanliness of the processing chamber 23, all of the three communication ports 81, 82, and 83 may be closed when the cleaning liquid is injected from the three cleaning nozzles 121, 122, 123.

(4) In each example and each modified example described above, for example, as illustrated in FIG. 7, the distribution unit 131 (that is, the three opening/closing mechanisms 73, 74, and 75) of the exhaust switching mechanism 25 is disposed between the processing chamber 23 and the three exhaust pipes 61, 62, and 63. In this respect, the three exhaust pipes 61, 62, and 63 may be disposed between the processing chamber 23 and the distribution unit 131 (i.e., the three opening/closing mechanisms 73, 74, and 75).

(5) In each example and each modified example described above, the side wall 71C is provided between the switching box 71 and the three exhaust pipes 61, 62, and 63. In this respect, the side wall 71C may not be provided.

(6) In each example and each modified example described above, the processing chamber 23 may include a nozzle (not illustrated) that discharges the cleaning liquid onto the substrate W held by the holding and rotating unit. The cleaning liquid (e.g., carbon dioxide water) is supplied from the processing liquid supply source 145 to the nozzle.

The present invention may be embodied in other specific forms without departing from the spirit or essential attributes thereof and, accordingly, reference should be made to the appended claims, rather than to the foregoing specification, as indicating the scope of the invention.

What is claimed is:

1. A substrate processing device for processing a substrate, the substrate processing device comprising:

a processing chamber including a holding unit that holds the substrate in a horizontal posture and a chemical solution nozzle that discharges chemical solution to the substrate held by the holding unit;

a plurality of exhaust pipes provided on a side of the processing chamber; and an exhaust switching mechanism that switches an exhaust path from the processing chamber to any of the plurality of exhaust pipes, wherein the exhaust switching mechanism includes:

a switching box that connects the processing chamber to the plurality of exhaust pipes;

a plurality of opening/closing mechanisms that individually opens/closes a plurality of communication ports for individually communicating the switching box and the plurality of exhaust pipes; and a plurality of cleaning nozzles provided on an inner side of the switching box so as to correspond to the plurality of opening/closing mechanisms, each of the plurality of opening/closing mechanisms includes:

an actuator provided on an outer side of the switching box;

a lid member provided on the inner side of the switching box; and a link mechanism provided on the inner side of the switching box, the link mechanism converting linear movement of a rod extending from the actuator into opening/closing operation of the lid member, and each of the plurality of cleaning nozzles is provided to face the link mechanism of a corresponding one of the opening/closing mechanisms, and is configured to inject cleaning liquid to the link mechanism of the corresponding opening/closing mechanism.

2. The substrate processing device according to claim 1, wherein each of the plurality of cleaning nozzles is configured to inject the cleaning liquid to the link mechanism of the corresponding opening/closing mechanism such that an upper end of the lid member of the corresponding opening/closing mechanism is included in an injection range of the cleaning liquid.

3. The substrate processing device according to claim 1, wherein each of the plurality of opening/closing mechanisms includes a packing provided on a surface of the lid member facing one communication port of the plurality of communication ports to surround an outer periphery of the one communication port.

4. The substrate processing device according to claim 1, wherein the exhaust switching mechanism further includes a nozzle attachment member provided on the inner side of the switching box and to which the plurality of cleaning nozzles are attached, the nozzle attachment member has a cleaning liquid flow path for sending the cleaning liquid on an inner side, and the cleaning liquid flow path is branched to send the cleaning liquid supplied from a common inlet to the plurality of cleaning nozzles.

5. The substrate processing device according to claim 4, wherein the switching box is connected to an inside of the processing chamber via a connecting pipe, the connecting pipe includes an exhaust control damper for controlling an air volume of gas on an inner side, and the exhaust switching mechanism includes:

a control damper cleaning nozzle provided on the inner side of the switching box and configured to inject the cleaning liquid toward the exhaust control damper;

a first cleaning liquid piping provided on the inner side of the switching box and connected to the control damper cleaning nozzle; and a second cleaning liquid piping provided on the inner side of the switching box, the second cleaning liquid piping being branched from the first cleaning liquid piping and connected to the common inlet of the nozzle attachment member.

6. The substrate processing device according to claim 1, further comprising:

a control unit, wherein the control unit sequentially switches a state in which any one of the plurality of communication ports is opened in order among the plurality of communication ports by operating the plurality of opening/closing mechanisms when the cleaning liquid is injected from the plurality of cleaning nozzles.

7. The substrate processing device according to claim 1, further comprising:

a plurality of exhaust pipe side cleaning nozzles provided on inner sides of the plurality of exhaust pipes, respectively, the plurality of exhaust pipe side cleaning nozzles respectively injecting the cleaning liquid to the lid members of the plurality of opening/closing mechanisms through the plurality of communication ports.

8. The substrate processing device according to claim 1, wherein the switching box is connected to an inside of the processing chamber via a connecting pipe, and a bottom surface on the inner side of the switching box is inclined such that the cleaning liquid is collected in the connecting pipe.

9. The substrate processing device according to claim 1, wherein the switching box is connected to an inside of the processing chamber via a connecting pipe, and a bottom surface on an inner side of the switching box is higher than a bottom surface on an inner side of the processing chamber and is the same height as a bottom surface on an inner side of the connecting pipe.

10. The substrate processing device according to claim 1, wherein each of the plurality of cleaning nozzles is formed by a one-fluid nozzle that injects only the cleaning liquid.

11. The substrate processing device according to claim 1, wherein each of the plurality of cleaning nozzles injects mist-like cleaning liquid.

12. A maintenance method for a substrate processing device for processing a substrate, wherein the substrate processing device includes:

a processing chamber including a holding unit that holds the substrate in a horizontal posture and a chemical solution nozzle that discharges chemical solution to the substrate held by the holding unit;

a plurality of exhaust pipes provided on a side of the processing chamber; and an exhaust switching mechanism that switches an exhaust path from the processing chamber to any of the plurality of exhaust pipes, the exhaust switching mechanism includes:

a switching box that connects the processing chamber to the plurality of exhaust pipes; and a plurality of opening/closing mechanisms that individually opens/closes a plurality of communication ports for individually communicating the switching box and the plurality of exhaust pipes, each of the plurality of opening/closing mechanisms includes:

an actuator provided on an outer side of the switching box;

a lid member provided on the inner side of the switching box; and a link mechanism provided on the inner side of the switching box, the link mechanism converting linear movement of a rod extending from the actuator into opening/closing operation of the lid member, the maintenance method comprising:

an injection step of injecting cleaning liquid from a plurality of cleaning nozzles to the link mechanisms of corresponding ones of the plurality of opening/closing mechanisms, wherein the plurality of cleaning nozzles are provided on an inner side of the switching box to face the link mechanisms of the corresponding plurality of opening/closing mechanisms.

* * * * *